United States Patent
Cheng et al.

(10) Patent No.: US 10,191,255 B2
(45) Date of Patent: Jan. 29, 2019

(54) FOUR-ELEMENT ATHERMAL LENS

(71) Applicant: OmniVision Technologies, Inc., Santa Clara, CA (US)

(72) Inventors: Tingyu Cheng, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 101 days.

(21) Appl. No.: 15/273,051

(22) Filed: Sep. 22, 2016

(65) Prior Publication Data

US 2018/0081154 A1 Mar. 22, 2018

(51) Int. Cl.
*G02B 13/14* (2006.01)
*G02B 5/00* (2006.01)
*G02B 9/34* (2006.01)

(52) U.S. Cl.
CPC ............. *G02B 13/14* (2013.01); *G02B 5/005* (2013.01); *G02B 9/34* (2013.01)

(58) Field of Classification Search
CPC .... G02B 13/13; G02B 13/146; G02B 13/001; G02B 13/008; G02B 13/0015;
(Continued)

(56) References Cited

U.S. PATENT DOCUMENTS

2011/0007195 A1* 1/2011 Fukuda ................... G02B 7/02
348/294
2012/0050879 A1* 3/2012 Kathman ......... B29D 11/00298
359/652

(Continued)

*Primary Examiner* — Marin Pichler
(74) *Attorney, Agent, or Firm* — Lathrop Gage LLP

(57) ABSTRACT

A four-element athermal lens includes four coaxially aligned lenses including a (i) first lens and, in order of increasing distance therefrom and on a same side thereof, (ii) a second lens, a third lens, and a fourth lens. The first lens and the second lens are positive lenses. The third and fourth lenses are negative lenses. The first lens, second lens, third lens, and fourth lens have equal respective refractive indices $n_1$, $n_2$, $n_3$, and $n_4$. A difference between (i) the maximum of $n_1$, $n_2$, $n_3$, and $n_4$ and (ii) the minimum of $n_1$, $n_2$, $n_3$, and $n_4$ being less than 0.05 in a free-space wavelength range. Refractive indices $n_1$, $n_2$, $n_3$, and $n_4$ have respective temperature dependences $$\frac{\Delta n_1}{\Delta T}, \frac{\Delta n_2}{\Delta T}, \frac{\Delta n_3}{\Delta T}, \frac{\Delta n_4}{\Delta T}.$$

Each of $$\frac{\Delta n_1}{\Delta T} \text{ and } \frac{\Delta n_2}{\Delta T}$$

exceeds, in the free-space wavelength range, each of $$\frac{\Delta n_3}{\Delta T} \text{ and } \frac{\Delta n_4}{\Delta T}$$

by a factor between 2.05 and 2.85, inclusive.

13 Claims, 19 Drawing Sheets

(58) Field of Classification Search
CPC ............... G02B 13/002; G02B 13/004; G02B 13/0045; G02B 13/006; G02B 5/005; G02B 9/34; G02B 9/60; G02B 9/62
USPC .......................................... 359/355–357, 820
See application file for complete search history.

(56) References Cited

U.S. PATENT DOCUMENTS

| | | | | |
|---|---|---|---|---|
| 2013/0050839 A1* | 2/2013 | Oskotsky | ................. | G02B 9/12 359/662 |
| 2013/0050840 A1* | 2/2013 | Oskotsky | ............... | G02B 13/22 359/663 |
| 2014/0376106 A1* | 12/2014 | Oskotsky | ............... | G02B 7/028 359/708 |

* cited by examiner

| surface | radius $r_c$ (mm) | thickness (mm) | n (λ=850 nm) | Abbe number | minimum diameter (mm) | conic k | aspheric coefficient 4th-order term $a_4$ | 6th-order term $a_6$ | 8th-order term $a_8$ | 10th-order term $a_{10}$ | 12th-order term $a_{12}$ | 14th-order term $a_{14}$ |
|---|---|---|---|---|---|---|---|---|---|---|---|---|
| 211(1) | -1.797 | 0.1400 | 1.51 | 49.8 | 2.62 | 0 | 0.2497 | -0.1198 | 0.0425 | -0.0051 | 0 | 0 |
| 261(1)F | ∞ | 0.4000 | 1.51 | 62.6 | 2.35 | 0 | 0 | 0 | 0 | 0 | 0 | 0 |
| 221(1) | ∞ | 0.0200 | 1.51 | 49.8 | 1.99 | 0 | 0 | 0 | 0 | 0 | 0 | 0 |
| 222(1) | 1.330 | 0.5200 | 1.00 | -- | 1.73 | -2.1927 | -0.1475 | 0.5750 | -0.8496 | 0.4390 | 0.0911 | 0 |
| 231(1) | 0.835 | 0.2900 | 1.51 | 49.8 | 1.42 | -1.0475 | -0.2286 | 0.3863 | -0.8928 | 0.7696 | 0.2701 | 0 |
| 262(1)F | ∞ | 0.8000 | 1.51 | 62.6 | 1.39 | 0 | 0 | 0 | 0 | 0 | 0 | 0 |
| 263(1)F | ∞ | 1.3000 | 1.51 | 62.6 | 0.71 | 0 | 0 | 0 | 0 | 0 | 0 | 0 |
| 241(1) | ∞ | 0.2800 | 1.51 | 49.8 | 1.42 | 0 | 0 | 0 | 0 | 0 | 0 | 0 |
| 242(1) | -1.197 | 1.3500 | 1.00 | -- | 1.47 | -5.1300 | -0.3144 | 1.7199 | -7.3993 | 20.0791 | -27.3912 | 14.7108 |
| 265F | ∞ | 0.4000 | 1.51 | 62.6 | 2.24 | 0 | 0 | 0 | 0 | 0 | 0 | 0 |
| 265B | ∞ | 0.0500 | 1.00 | -- | 2.37 | 0 | 0 | 0 | 0 | 0 | 0 | 0 |
| 278(1) | ∞ | -- | -- | -- | 2.40 | 0 | 0 | 0 | 0 | 0 | 0 | 0 |

FIG. 4

| λ, nm | refractive index 1701 | refractive index 1702 | λ, nm | refractive index 1701 | refractive index 1702 | λ, nm | refractive index 1701 | refractive index 1702 |
|---|---|---|---|---|---|---|---|---|
| 400 | 1.53771 | 1.53877 | 570 | 1.51947 | 1.52049 | 740 | 1.51269 | 1.51370 |
| 405 | 1.53676 | 1.53782 | 575 | 1.51918 | 1.52021 | 745 | 1.51256 | 1.51357 |
| 410 | 1.53586 | 1.53691 | 580 | 1.51890 | 1.51992 | 750 | 1.51242 | 1.51344 |
| 415 | 1.53499 | 1.53604 | 585 | 1.51863 | 1.51965 | 755 | 1.51229 | 1.51331 |
| 420 | 1.53416 | 1.53521 | 590 | 1.51836 | 1.51938 | 760 | 1.51217 | 1.51318 |
| 425 | 1.53336 | 1.53441 | 595 | 1.51810 | 1.51912 | 765 | 1.51204 | 1.51305 |
| 430 | 1.53260 | 1.53365 | 600 | 1.51785 | 1.51887 | 770 | 1.51192 | 1.51293 |
| 435 | 1.53187 | 1.53292 | 605 | 1.51760 | 1.51863 | 775 | 1.51179 | 1.51281 |
| 440 | 1.53117 | 1.53221 | 610 | 1.51736 | 1.51838 | 780 | 1.51168 | 1.51269 |
| 445 | 1.53049 | 1.53154 | 615 | 1.51713 | 1.51815 | 785 | 1.51156 | 1.51257 |
| 450 | 1.52984 | 1.53089 | 620 | 1.51690 | 1.51792 | 790 | 1.51144 | 1.51245 |
| 455 | 1.52922 | 1.53026 | 625 | 1.51668 | 1.51770 | 795 | 1.51133 | 1.51234 |
| 460 | 1.52862 | 1.52966 | 630 | 1.51646 | 1.51748 | 800 | 1.51122 | 1.51223 |
| 465 | 1.52804 | 1.52908 | 635 | 1.51625 | 1.51727 | 805 | 1.51111 | 1.51212 |
| 470 | 1.52748 | 1.52852 | 640 | 1.51604 | 1.51706 | 810 | 1.51100 | 1.51201 |
| 475 | 1.52694 | 1.52798 | 645 | 1.51583 | 1.51685 | 815 | 1.51090 | 1.51191 |
| 480 | 1.52642 | 1.52746 | 650 | 1.51564 | 1.51665 | 820 | 1.51079 | 1.51180 |
| 485 | 1.52592 | 1.52696 | 655 | 1.51544 | 1.51646 | 825 | 1.51069 | 1.51170 |
| 490 | 1.52544 | 1.52647 | 660 | 1.51525 | 1.51627 | 830 | 1.51059 | 1.51160 |
| 495 | 1.52497 | 1.52600 | 665 | 1.51507 | 1.51608 | 835 | 1.51049 | 1.51150 |
| 500 | 1.52452 | 1.52555 | 670 | 1.51488 | 1.51590 | 840 | 1.51039 | 1.51140 |
| 505 | 1.52408 | 1.52511 | 675 | 1.51470 | 1.51572 | 845 | 1.51029 | 1.51130 |
| 510 | 1.52366 | 1.52469 | 680 | 1.51453 | 1.51555 | 850 | 1.51020 | 1.51121 |
| 515 | 1.52325 | 1.52428 | 685 | 1.51436 | 1.51538 | 855 | 1.51010 | 1.51111 |
| 520 | 1.52285 | 1.52388 | 690 | 1.51419 | 1.51521 | 860 | 1.51001 | 1.51102 |
| 525 | 1.52246 | 1.52349 | 695 | 1.51403 | 1.51504 | 865 | 1.50992 | 1.51093 |
| 530 | 1.52209 | 1.52312 | 700 | 1.51387 | 1.51488 | 870 | 1.50983 | 1.51084 |
| 535 | 1.52173 | 1.52276 | 705 | 1.51371 | 1.51473 | 875 | 1.50974 | 1.51075 |
| 540 | 1.52138 | 1.52240 | 710 | 1.51356 | 1.51457 | 880 | 1.50966 | 1.51066 |
| 545 | 1.52104 | 1.52206 | 715 | 1.51341 | 1.51442 | 885 | 1.50957 | 1.51058 |
| 550 | 1.52070 | 1.52173 | 720 | 1.51326 | 1.51427 | 890 | 1.50949 | 1.51049 |
| 555 | 1.52038 | 1.52141 | 725 | 1.51311 | 1.51413 | 895 | 1.50940 | 1.51041 |
| 560 | 1.52007 | 1.52110 | 730 | 1.51297 | 1.51398 | 900 | 1.50932 | 1.51033 |
| 565 | 1.51976 | 1.52079 | 735 | 1.51283 | 1.51384 | | | |

FIG. 17

|  | 830 nm | 850 nm | 870 nm |
|---:|---:|---:|---:|
| −40 °C | 1.52577 | 1.52537 | 1.52500 |
| 20 °C | 1.51238 | 1.51199 | 1.51162 |
| 125 °C | 1.48885 | 1.48848 | 1.48813 |

—1901

|  | 830 nm | 850 nm | 870 nm |
|---:|---:|---:|---:|
| −40 °C | 1.51819 | 1.51780 | 1.51743 |
| 20 °C | 1.51238 | 1.51199 | 1.51162 |
| 125 °C | 1.50212 | 1.50174 | 1.50138 |

FOUR-ELEMENT ATHERMAL LENS

BACKGROUND

Camera modules designed to capture images of objects that emit near-infrared (near-IR) light are used in applications such as gesture detection, head and eye tracking, and motion detection. For example, FIG. 1 depicts a hand 190 in the field of view of a gesture recognition system 110. A camera module 120 images hand 190, which moves in directions x, y, and z of a coordinate system 198. Camera module 120 includes an image sensor 130 and an imaging lens 100. Image sensor 130 includes a pixel array 132 upon which imaging lens 100 forms an image of hand 190. Pixel array 132 has a width 132W and imaging lens 100 has an optical axis 100X.

Effectiveness of gesture recognition system 110 depends on its ability to meet performance specifications at a temperature range characteristic of its application. For example, a typical temperature range for automotive applications is −40° C. to 125° C. Hence, the accuracy of gesture recognition depends in part on imaging lens 100's being athermalized such that it forms a clear image on image sensor 132 within the temperature range associated with its application. For example, lens 100 images light 192 propagating from a point 190P on hand 190 to a point 102. Light 192 is for example near-IR light. Point 102 is located a field height $x_1$ from optical axis 100X and a focal shift $\Delta z_1$ from pixel array 132. Focal shift $\Delta z_1 = 0$ corresponds to when imaging lens 100 forms an in-focus image of point 190P on image sensor 132. The magnitude of focal shift $\Delta z_1$ as a function of field height $x_1$ and ambient temperature T is an athermalization metric for lens 100.

SUMMARY OF THE INVENTION

Embodiments of the present invention provide an athermal lens system. Embodiments of the athermal lens system herein may be suitable for the above-mentioned gesture recognition application, as well as any other application desirable to have an athermal lens system.

In one embodiment, a four-element athermal lens includes four coaxially aligned lenses including a (i) first lens and, in order of increasing distance therefrom and on a same side thereof, (ii) a second lens, a third lens, and a fourth lens. The first lens and the second lens are positive lenses. The third and fourth lenses are negative lenses. The first lens, second lens, third lens, and fourth lens have respective refractive indices $n_1$, $n_2$, $n_3$, and $n_4$. A difference between (i) the maximum of $n_1$, $n_2$, $n_3$, and $n_4$ and (ii) the minimum of $n_1$, $n_2$, $n_3$, and $n_4$ being less than 0.05 in a free-space wavelength range. Refractive indices $n_1$, $n_2$, $n_3$, and $n_4$ have respective temperature dependences $$\frac{\Delta n_1}{\Delta T}, \frac{\Delta n_2}{\Delta T}, \frac{\Delta n_3}{\Delta T}, \frac{\Delta n_4}{\Delta T}.$$

In an embodiment, each of $$\frac{\Delta n_1}{\Delta T} \text{ and } \frac{\Delta n_2}{\Delta T}$$

exceeds, in the free-space wavelength range, each of $$\frac{\Delta n_3}{\Delta T} \text{ and } \frac{\Delta n_4}{\Delta T}$$

by a factor between 2.05 and 2.85, inclusive. In an embodiment, the first lens, second lens, third lens, and the fourth lens have respective radii of curvature $R_1$, $R_2$, $R_3$, and $R_4$ that satisfy $R_1/R_4 > 1.444$ and $R_2/R_3 < 1.654$.

BRIEF DESCRIPTION OF THE FIGURES

FIG. 4 shows a table of exemplary parameters of the four-element athermal lens of FIG. 3.

FIGS. 7A, 76B, and 7C are plots of the f-theta distortion of the four-element athermal lens within the imaging system of FIG. 3.

FIG. 17 is a table of refractive index values of the four-element athermal lenses of FIG. 3 and FIG. 10.

FIG. 19 is a table of refractive index values of the four-element athermal lenses of FIG. 3 and FIG. 10 at different temperatures.

DETAILED DESCRIPTION OF THE EMBODIMENTS

Figure 1:
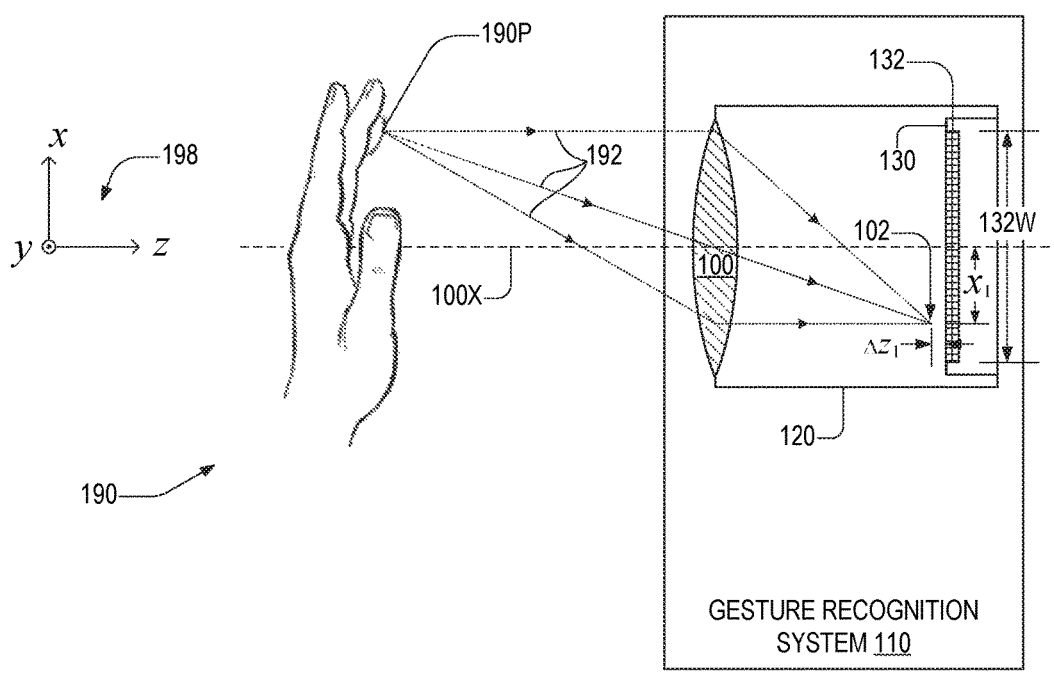
FIG. 1 depicts a gesture recognition system with a camera module that includes an imaging lens.
Figure 2:
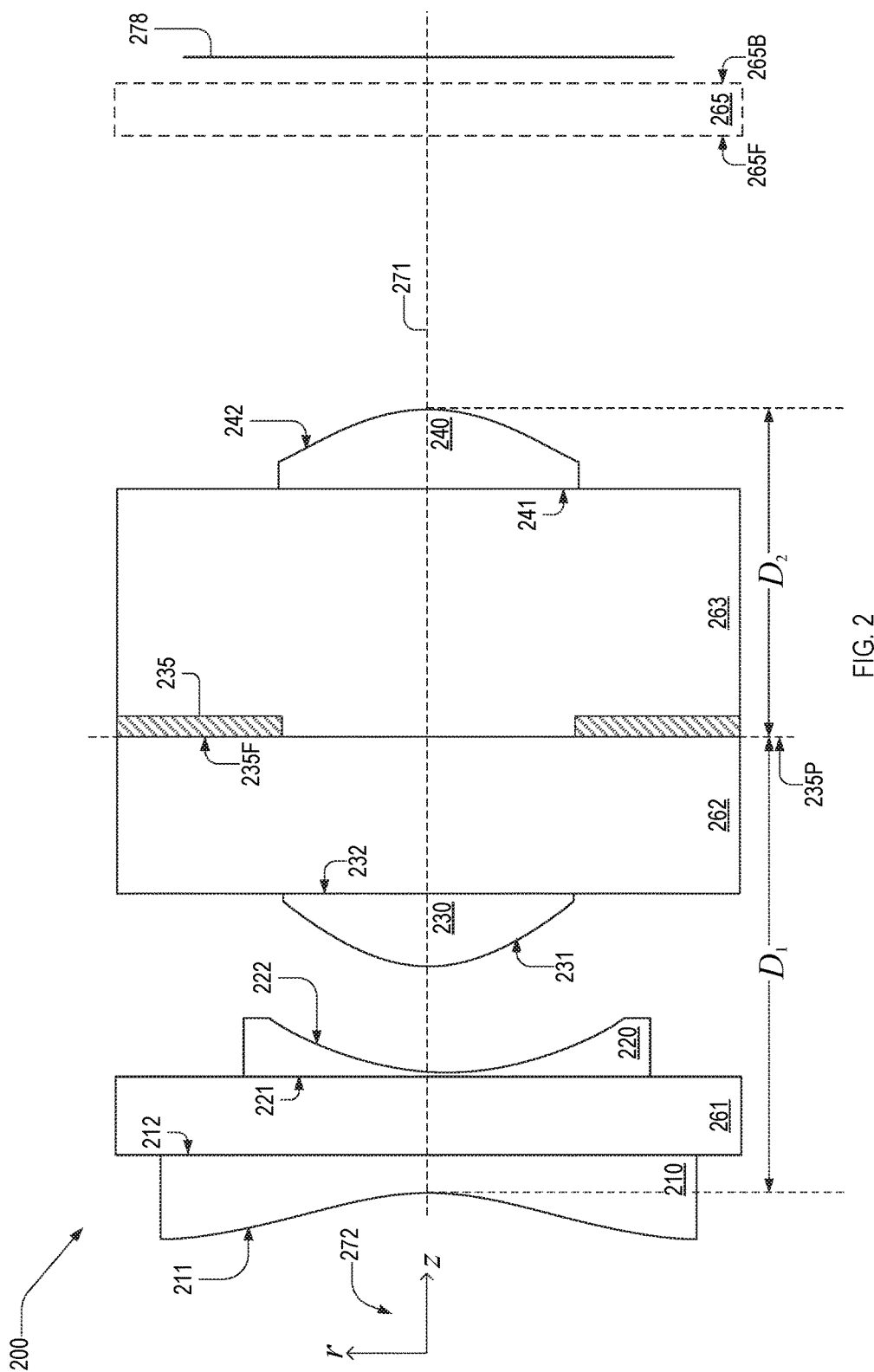
FIG. 2 is a cross-sectional view of a four-element athermal lens, which is compatible for use the camera module of FIG. 1, in an embodiment.

FIG. 2 is a cross-sectional view of a four-element athermal lens 200, which is compatible for use in camera module 120 in place of lens 100. Four-element athermal lens 200 includes biplanar substrates 261, 262, and 263, a first lens 210, a second lens 220, a third lens 230, and a fourth lens 240. Lenses 210 and 220 have respective planar surfaces 212 and 221 and respective concave surfaces 211 and 222. Lenses 230 and 240 have respective planar surfaces 232 and 241 and respective convex surfaces 231 and 242.

Four-element athermal lens 200 also includes an aperture stop 235 between lenses 230 and 240. Aperture stop 235 has a front surface 235F in a plane 235P. Aperture stop 235 is for example located between substrates 262 and 263. Lens 210 collects light into lens 200. Lenses 220 and 230 are positioned to guide rays collected by lens 210 through aperture stop 235. Aperture stop 235 is positioned between lenses 230 and 240 to optimize mirror symmetry of lens 200 about aperture stop 235, which results in reduced aberrations. Lens 240 directs light propagating therethrough to an image plane 278.

Four-element athermal lens 200 also may include a cover glass 265. When included in four-element athermal lens 200, cover glass 265 covers a pixel array of an image sensor (not shown) located at image plane 278. Cover glass 265 has a front surface 265F and a back surface 265B. The specific type of pixel array and image sensor may vary and is thus not discussed in detail herein.

Lenses 210, 220, 230, and 240 may have a common optical axis 271. Substrates 262 and 263 may be a single optical element. Without departing from the scope hereof, four-element athermal lens 200 may include an optical element between one or more of substrate 261 and lens 210, substrate 261 and lens 220, substrate 262 and lens 230, substrate 263 and lens 240.

Lenses 210, 220, 230, and 240 may be formed of a solder-reflow compatible material via a wafer-level optics replication process. A solder-reflow compatible material for example withstands surface-mount technology (SMT) reflow soldering processes occurring at temperatures exceeding 250° C. Lenses 210, 220, 230, and 240 may also be formed via injection molding or other methods known in the art. Alternatively, lenses 210, 220, 230, and 240 may be formed of glass via precision glass molding (also known as ultra-precision glass pressing) or other methods known in the art.

While each of lenses 210, 220, 230, and 240 is illustrated as a singlet lens in FIG. 2, at least one of lenses 210, 220, 230, and 240 may be a non-singlet lens without departing from the scope hereof.

Embodiments of four-element athermal lens 200 may satisfy at least one of the following limitations, which enable it to have an athermalization metric $\Delta z_1/\Delta T < 0.2$ μm/° C. at temperatures between $-40°$ C. and $125°$ C. and wavelengths $\lambda_0 = 850 \pm 20$ nm. Herein, $\lambda_0 = 850 \pm 20$ nm is referred to as the design wavelength range.

Curved surfaces 211, 222, 231, and 242 have respective radii of curvature $R_1$, $R_2$, $R_3$, and $R_4$. Radii $R_1$ and $R_4$ may satisfy $R_1/R_4 > 1.444$. Radii $R_2$ and $R_3$ satisfy $R_2/R_3 < 1.654$.

Four-element athermal lens 200 has an axial length $D_1 + D_2$ on optical axis 271, where $D_1$ and $D_2$ are respective lengths of four-element athermal lens 200 before and after the aperture stop. Specifically, on optical axis 271, distance $D_1$ is the distance between surface 211 and aperture-stop plane 235P, and distance $D_2$ is the distance between aperture-stop plane 235P and surface 242. Distances $D_1$ and $D_2$ may satisfy a constraint $D_1/D_2 < 1.58$.

Lenses 210, 220, 230, and 240 are formed of materials having respective refractive indices (at free-space wavelength $\lambda_0$) $n_1$, $n_2$, $n_3$, $n_4$ and respective Abbe numbers $V_1$, $V_2$, $V_3$, $V_4$. Wavelength $\lambda_0$ is for example 850 nm. Herein, Abbe numbers are defined by $$V_d = \frac{n_d - 1}{n_F - n_C},$$

where refractive indices $n_F$, $n_d$, and $n_C$ are correspond to material refractive indices, at standard ambient temperature, at the blue (F), green (d), and red (C) Fraunhofer spectral lines respectively, where $\lambda_F = 486.1$ nm, $\lambda_d = 587.6$ nm, and $\lambda_C = 656.3$ nm.

The refractive index of lenses 210, 220, 230, and 240 may be equal or approximately equal such that, within the design wavelength range, the difference between the maximum value $n_{max}$ of $n_{1-4}$ and the minimum value $n_{min}$ of $n_{1-4}$ is $(n_{max} - n_{min}) < 0.05$. The Abbe number of lenses 210, 220, 230, and 240 may be equal or approximately equal such that the difference between the maximum value $V_{max}$ of $V_{1-4}$ and the minimum value $V_{max}$ of $V_{1-4}$ have a relative difference less than five percent.

Refractive indices $n_1$, $n_2$, $n_3$, $n_4$ have respective temperature dependences $$\frac{\Delta n_1}{\Delta T}, \frac{\Delta n_2}{\Delta T}, \frac{\Delta n_3}{\Delta T}, \frac{\Delta n_4}{\Delta T}$$

in me design wavelength range. As quantities $\Delta n$ and $\Delta T$ approach zero, temperature dependence $$\frac{\Delta n}{\Delta T}$$

approaches a temperature derivative $$\frac{dn}{dT}: \lim_{\Delta n, \Delta T \to 0} \frac{\Delta n}{\Delta T} = \frac{dn}{dT}.$$

Temperature dependences $$\frac{\Delta n_1}{\Delta T} \text{ and } \frac{\Delta n_2}{\Delta T}$$

may be equal, for example, when lenses 210 and 220 are formed of the same material. Alternatively, lenses 210 and 220 may be formed of the different materials such that $$\frac{\Delta n_1}{\Delta T} \text{ and } \frac{\Delta n_2}{\Delta T}$$

are approximately equal, for example, having a relative difference less than ten percent. Temperature dependences $$\frac{\Delta n_3}{\Delta T} \text{ and } \frac{\Delta n_4}{\Delta T}$$

may be equal, for example, when lenses 230 and 240 are formed of the same material. Alternatively, lenses 230 and 240 may be formed of the different materials such that $\frac{\Delta n_3}{\Delta T}$ and $\frac{\Delta n_4}{\Delta T}$ are approximately equal, for example, having a relative difference less than ten percent. Temperature dependences $\frac{\Delta n_{1,2}}{\Delta T}$ exceed temperature dependences $\frac{\Delta n_{3,4}}{\Delta T}$.

For example, $$\frac{\Delta n_{1,2}}{\Delta T} = C_1 \frac{\Delta n_{3,4}}{\Delta T},$$

where $C_1$ is between 2.05 and 2.85, inclusive.

Four-Element Athermal Lens, Example 1

Figure 3:
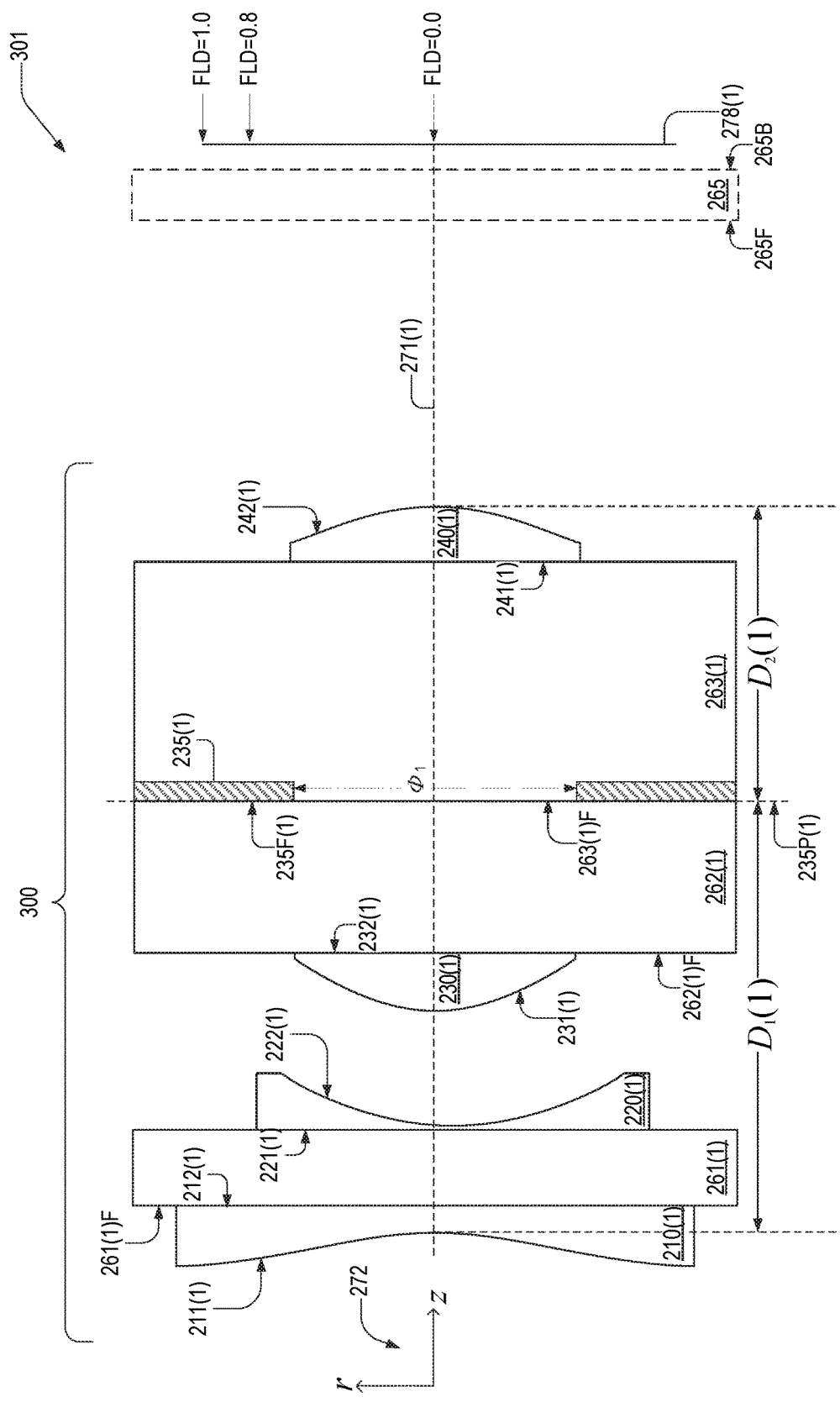
FIG. 3 is a cross-sectional view of an imaging system that includes a first embodiment of the four-element athermal lens of FIG. 2.

FIG. 3 is a cross-sectional view of a four-element athermal lens 300 in an imaging system 301. Imaging system 301 also includes cover glass 265 between athermal lens 300 and an image plane 278(1). Athermal lens 300 has a full-angle field of view of $2\phi_1=76°$ and a working f-number $N_w=2.81$.

Four-element athermal lens 300 in is an embodiment of four-element athermal lens 200. Athermal lens 300 includes substrates 261(1), 262(1), 263(1), an aperture stop 235(1), a first lens 210(1), a second lens 220(1), a third lens 230(1), and a fourth lens 240(1). Lenses 210(1), 220(1), 230(1), and 240(1) have respective planar surfaces 212(1), 221(1), 232(1), 241(1) and respective non-planar surfaces 211(1), 222(1), 231(1), and 242(1). Lenses 210(1), 220(1), 230(1), and 240(1) are coaxial with a common optical axis 271(1). Substrates 261(1)-263(1) have respective front surfaces 261(1)F-263(1)F.

Herein, a figure element denoted by a reference numeral suffixed by a parenthetical numeral indicates an example of the element indicated by the reference numeral. For example, lens 210(1) is an example of lens 210.

FIG. 4 shows a table 400 of exemplary parameters of each surface of four-element athermal lens 300. Table 400 includes columns 404, 406, 408, 410, 412, and 421-427. Surface column 421 denotes surfaces of substrates 261(1)-263(1), cover glass 265, lenses 210(1), 220(1), 230(1), and 240(1), and an image plane 278(1) of FIG. 3. Column 423 includes thickness values, in millimeters, between adjacent surfaces of four-element athermal lens 300 on optical axis 271(1). Column 423 includes center thicknesses of substrates 261(1)-263(1), cover glass 265, and lenses 210(1), 220(1), 230(1), and 240(1). A thickness value in column 423 in a row denoting a specific surface indicates the on-axis distance between that specific surface and the next surface. For example, on optical axis 271(1), surfaces 211(1) and 261(1)F are separated by 0.1400 mm, surfaces 261(1)F and 221(1) are separated by 0.4000 mm, and surfaces 221(1) and 221(1) are separated by 0.020 mm.

Column 426 indicates the minimum diameter of each surface sufficient for a ray incident on surface 211(1) that passes through aperture stop 235(1) to pass through that surface. Aperture stop 235(1) has a diameter $\varnothing_1=0.71$ mm.

It should be appreciated that imaging system 301 need not include cover glass 265, in which image plane 278(1) shifts toward four-element athermal lens 300.

Surfaces 211(1), 222(1), 231(1), and 242(1) are defined by surface sag $z_{sag}$, shown in Eqn. 1.

$$z_{sag} = \frac{cr^2}{1+\sqrt{1-(1+k)c^2r^2}} + \sum_{i=2}^{N} \alpha_{2i} r^{2i} \quad (1)$$

In Eqn. 1, $z_{sag}$ is a function of radial coordinate r, where directions z and r are shown in a coordinate system 272, FIG. 2. Quantity i is a positive integer and N=7. In Eqn. 1, the parameter c is the reciprocal of the surface radius of curvature $r_c$:

$$c = \frac{1}{r_c}.$$

Column 422 of table 400 lists $r_c$ values for surfaces 212(1), 222(1), 232(1), 241(1), and 252(1). Parameter k denotes the conic constant, shown in column 427. Columns 404, 406, 408, 410, 412, and 414 contain values of aspheric coefficients $\alpha_4$, $\alpha_6$, $\alpha_8$, $\alpha_{10}$, $\alpha_{12}$, and $\alpha_{14}$ respectively. The units of quantities in table 400 are consistent with $z_{sag}$ in Eqn. 1 being expressed in millimeters.

Column 424 lists values of material refractive index $n_d$ at free-space wavelength $\lambda=850$ nm, and column 425 lists the corresponding Abbe numbers $V_d$. The refractive index and Abbe number values corresponding to a surface characterize the material between the surface and the surface in the row beneath. For example, the refractive index and Abbe number between surface 211(1) and 261(1)F are 1.51 and 49.8, respectively, and the refractive index and Abbe number between surface 261(1)F and 221(1) are 1.51 and 62.6, respectively. Specifically, lenses 210(1), 220(1), 230(1), and 240(1) each have refractive index n=1.51 and Abbe number V=49.8. Non-dispersive materials have an undefined Abbe number, denoted by "--" in column 425.

Curved surfaces 211(1), 222(1), 231(1), and 242(1) have respective radii of curvature $R_1(1)$, $R_2(1)$, $R_3(1)$, and $R_4(1)$ shown in FIG. 4. Ratio $R_1(1)/R_4(1)=1.501$. Ratio $R_2(1)/R_3(1)=1.593$. Distance $D_1(1)=2.17$ and distance $D_2(1)=1.58$ such that $D_1(1)/D_2(1)=1.37$.

Figure 5A:
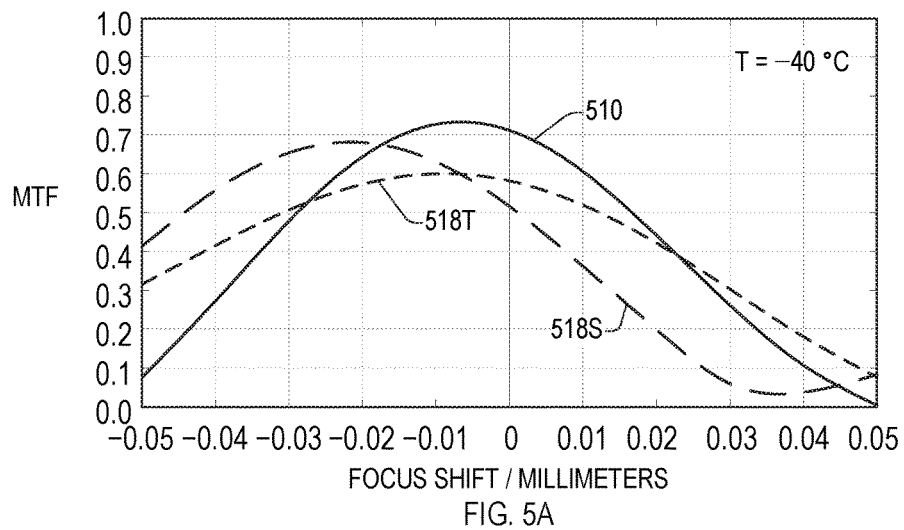
FIGS. 5A, 5B, and 5C are plots of the through-focus modulation transfer function (MTF) of the four-element athermal lens of FIG. 3 at different respective temperatures.
Figure 5B:
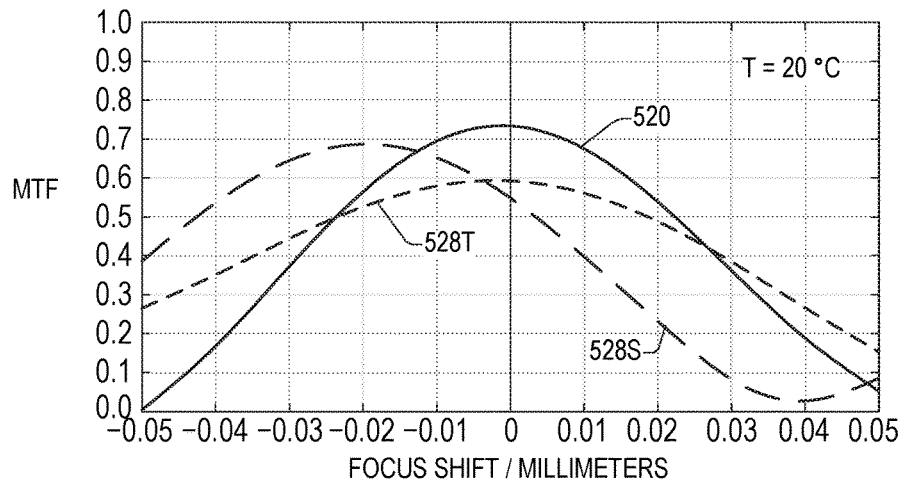
Figure 5C:
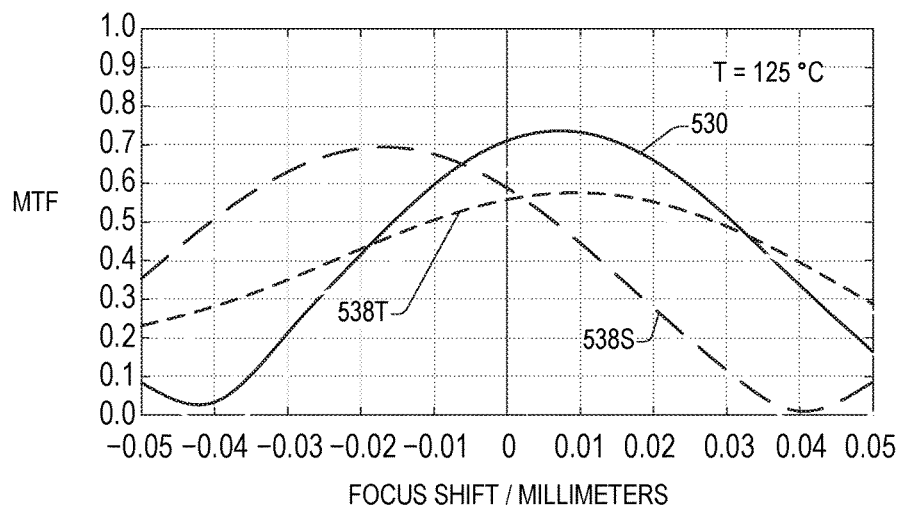

FIGS. 5A, 5B, and 5C are plots of the through-focus MTF, at 84 cycles/mm, of four-element athermal lens 300 at temperatures $T_1=-40°$ C., $T_2=20°$ C., and $T_3=125°$ C., respectively. Each through-focus MTF data point is the average of MTF values in a wavelength range of 830 nm to 870 nm. Four-element athermal lens 300 forms an image at normalized field positions, denoted as "FLD" on image plane 278(1). Normalized field positions FLD of FIG. 3 are between zero and one and is normalized by the half the diameter of image plane 278(1), shown in FIG. 4.

FIGS. 5A, 5B, and 5C include through-focus MTF curves 510, 520, and 530, which correspond to FLD=0. A comparison of the peaks of MTF curves 510, 520, and 530 shows that, between temperatures $T_1$ and $T_3$, the on-axis focal length shifts by $\Delta z_1 < 20$ µm, or $$\frac{\Delta z_1}{\Delta T} < 0.15 \text{ µm/° C.}$$

FIGS. 5A, 5B, and 5C also include through-focus MTF curves 518S, 528S, and 538S, which correspond to sagittal-plane MTF values at FLD=0.8, and through-focus MTF curves 518T, 528T, and 538T, which correspond to tangential-plane MTF values at FLD=0.8. A comparison of the peaks of MTF curves 518S, 528S, and 538S shows that, between temperatures $T_1$ and $T_3$, the sagittal-plane focal length at FLD=0.8 shifts by $\Delta z_1 < 5$ μm, or $$\frac{\Delta z_1}{\Delta T} < 0.05 \text{ μm/° C.}$$

A comparison of the peaks of MTF curves 518T, 528T, and 538T shows that, between −40° C. and 120° C., the tangential-plane focal length at FLD=0.8 shifts by $\Delta z_1$ 10 μm, or $$\frac{\Delta z_1}{\Delta T} < 0.10 \text{ μm/° C.}$$

FIGS. 6-9 are plots of longitudinal aberration, f-theta distortion, field curvature, and lateral color, respectively, of four-element athermal lens 300 within imaging system 301, as computed by Zemax®.

Figure 6A:
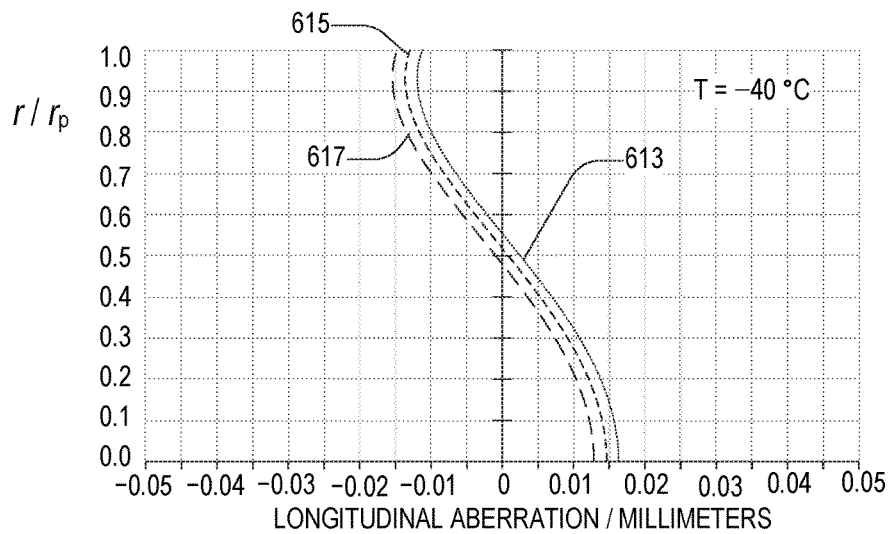
FIGS. 6A, 6B, and 6C are plots of the longitudinal aberration of the four-element athermal lens within the imaging system of FIG. 3.
Figure 6B:
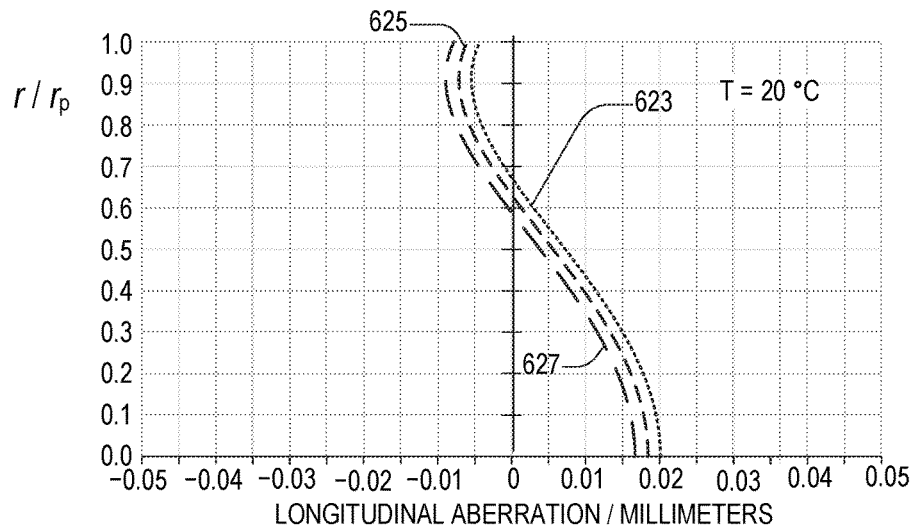
Figure 6C:
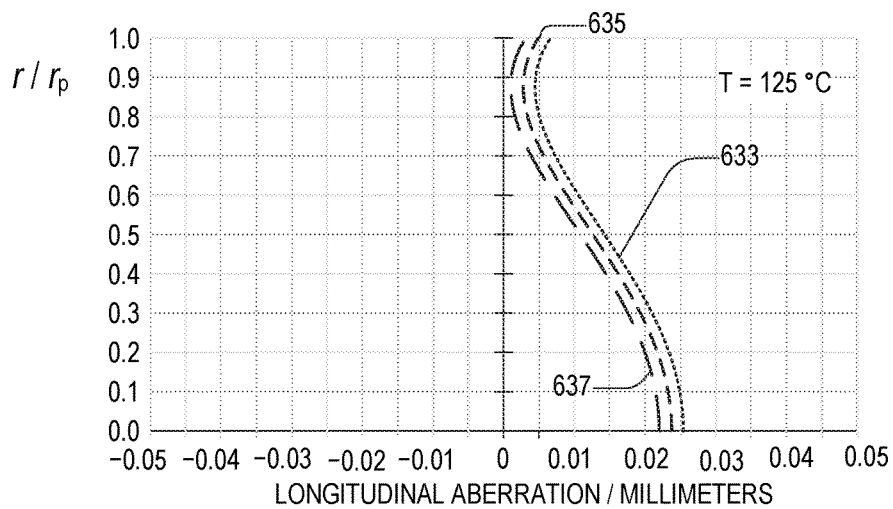

FIGS. 6A, 6B, and 6C are plots of the longitudinal aberration of four-element athermal lens 300 at temperatures $T_1$, $T_2$, and $T_3$, respectively. Longitudinal aberration is plotted in units of millimeters as a function of normalized radial coordinate $r/r_p$, where $r_p$=0.2657 mm is the maximum entrance pupil radius. Longitudinal aberration curves 613, 623, and 633 are computed at wavelength $\lambda_1$=830 nm. Longitudinal aberration curves 615, 625, and 635 are computed at wavelength $\lambda_2$=850 nm. Longitudinal aberration curves 617, 627, and 637 are computed at wavelength $\lambda_3$=870 nm.

Figure 7A:
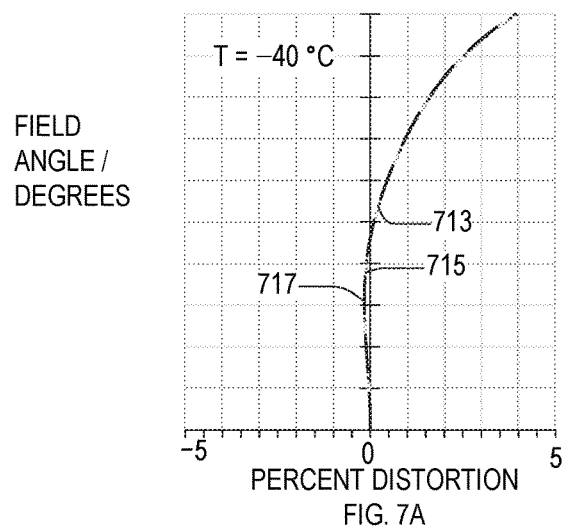
Figure 7B:
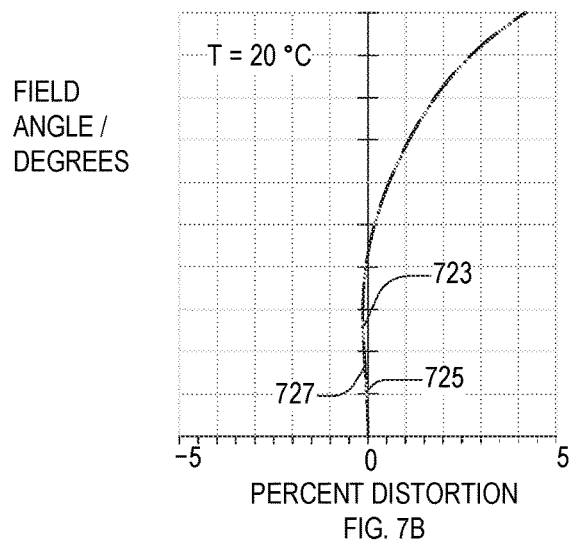
Figure 7C:
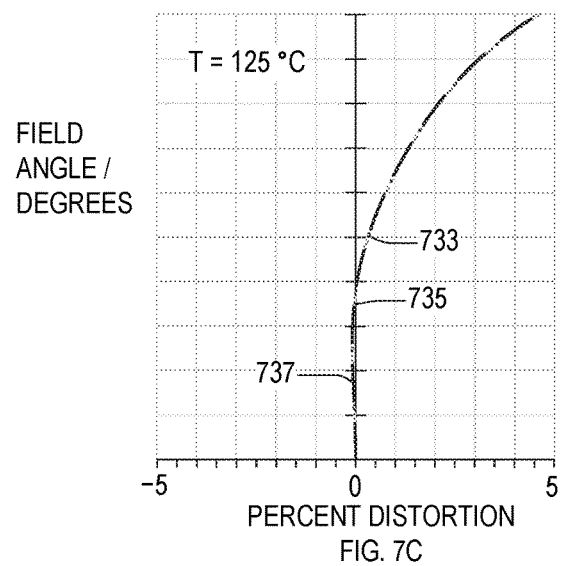

FIGS. 7A, 7B, and 7C are plots of f-theta distortion, versus field angle of four-element athermal lens 300 at temperatures $T_1$, $T_2$, and $T_3$, respectively. The maximum field angle plotted in FIG. 7 is =38.066°, which is half of lens 300's field of view. Distortion curves 713, 723, and 733 are computed at wavelength $\lambda_1$; distortion curves 715, 725, and 735 are computed at wavelength $\lambda_2$; and distortion curves 717, 727, and 737 are computed at wavelength $\lambda_3$.

Figure 8A:
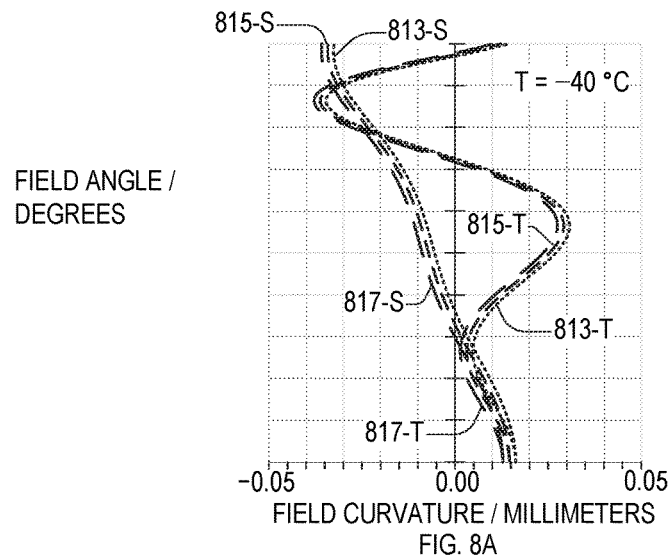
FIGS. 8A, 8B, and 8C are plots of the Petzval field curvature of the four-element athermal lens within the imaging system of FIG. 3.
Figure 8B:
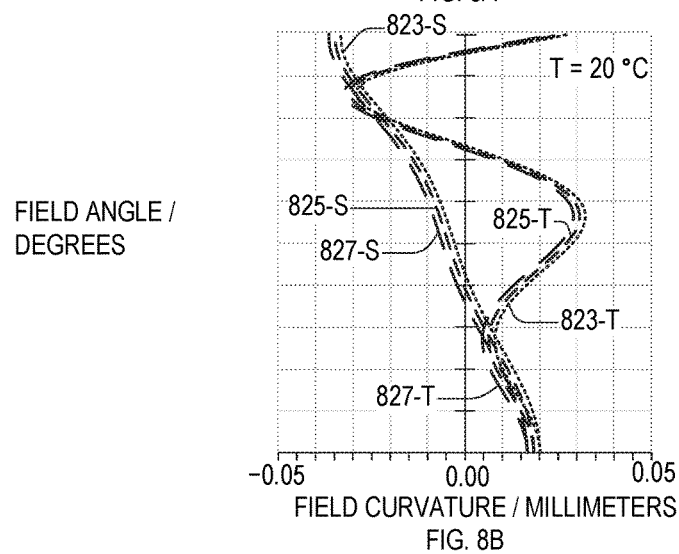
Figure 8C:
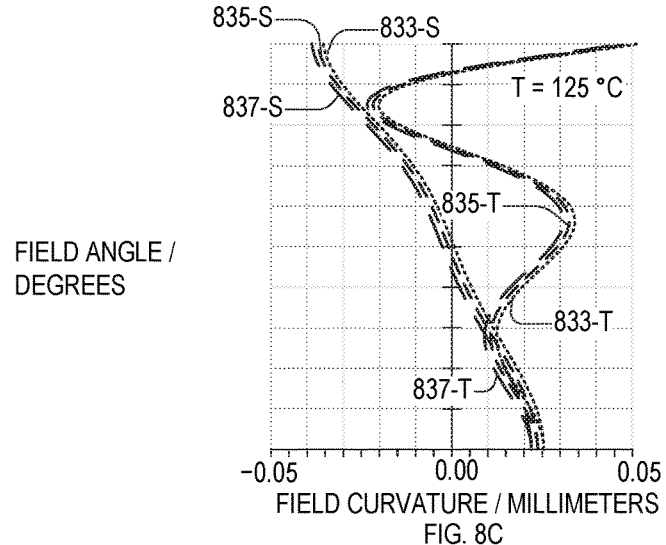

FIGS. 8A, 8B, and 8C are plots of Petzval field curvature, versus field angle of four-element athermal lens 300 at temperatures $T_1$, $T_2$, and $T_3$, respectively. The field curvature is plotted for field angles between zero and C. Field curvature curves 813-S/823-S/833-S and field curvature curves 813-T/823-T/833-T (short dashes) are computed at wavelength $\lambda_1$ in the sagittal and tangential planes, respectively. Field curvature curves 815-S/825-S/835-S and field curvature curves 815-T/825-T/835-T (medium dashes) are computed at wavelength $\lambda_2$ in the sagittal and tangential planes, respectively. Field curvature curves 817-S/827-S/837-S and field curvature curves 817-T/827-T/837-T (long dashes) correspond to field curvature at wavelength $\lambda_3$ in the sagittal and tangential planes, respectively.

Figure 9A:
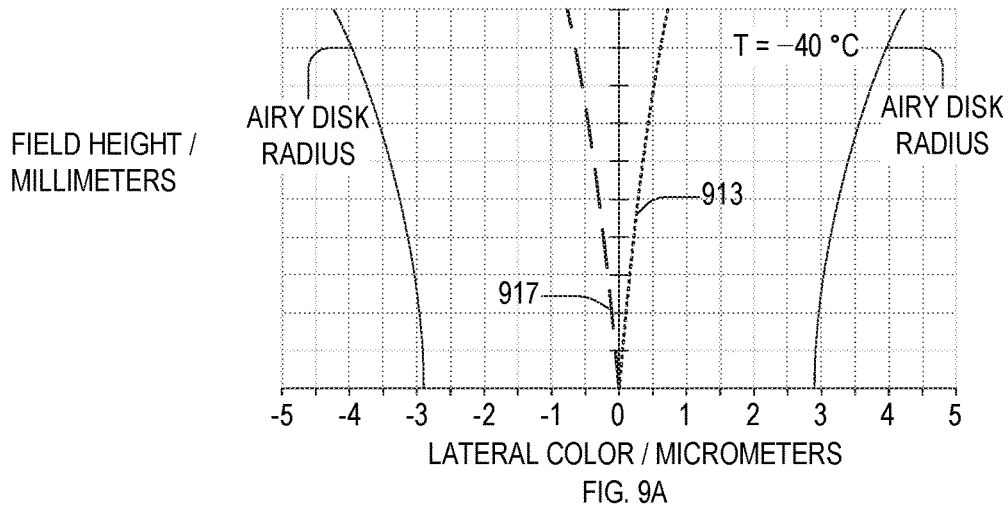
FIGS. 9A, 9B, and 9C are plots of the lateral color error of the four-element athermal lens within the imaging system of FIG. 3.
Figure 9B:
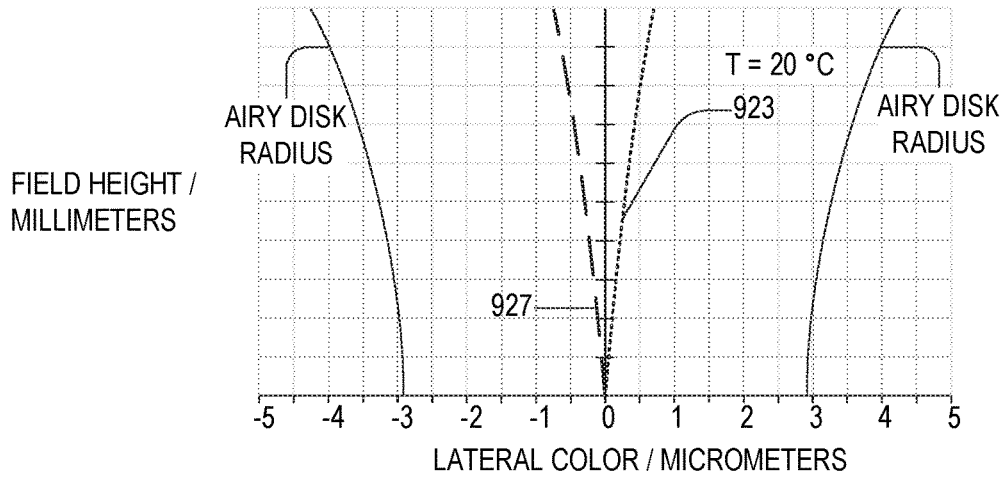
Figure 9C:
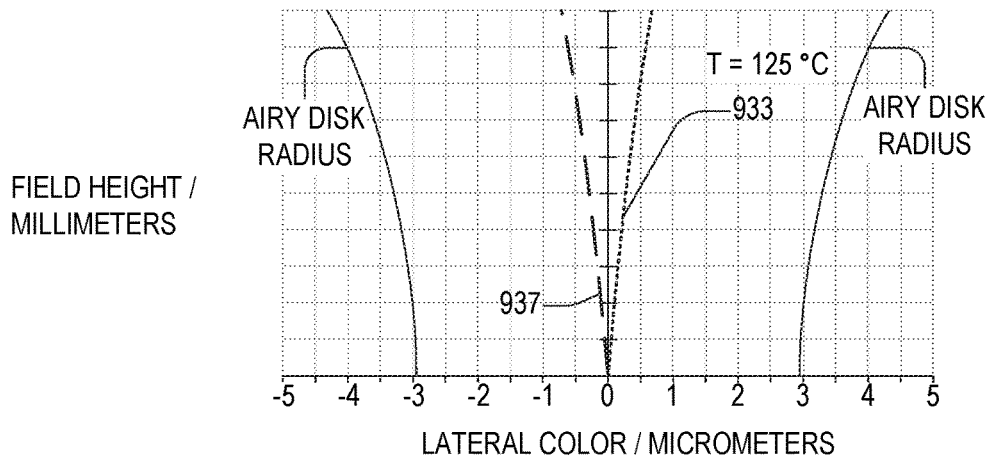

FIGS. 9A, 9B, and 9C are plots of lateral color error, also known as transverse chromatic aberration, versus field height of four-element athermal lens 300 at temperatures $T_1$, $T_2$, and $T_3$, respectively. Field height ranges from $h_{min}$=0 (on-axis) to $h_{max}$=1.20 mm in image plane 278(1). Lateral color is referenced to $\lambda_2$, and hence the lateral color for $\lambda_2$ is zero for all field heights. Lateral color curves 913, 923, and 933 are computed at wavelength $\lambda_1$. Lateral color curves 917, 927, and 937 are computed at wavelength $\lambda_3$.

Four-Element Athermal Lens, Example 2

Figure 10:
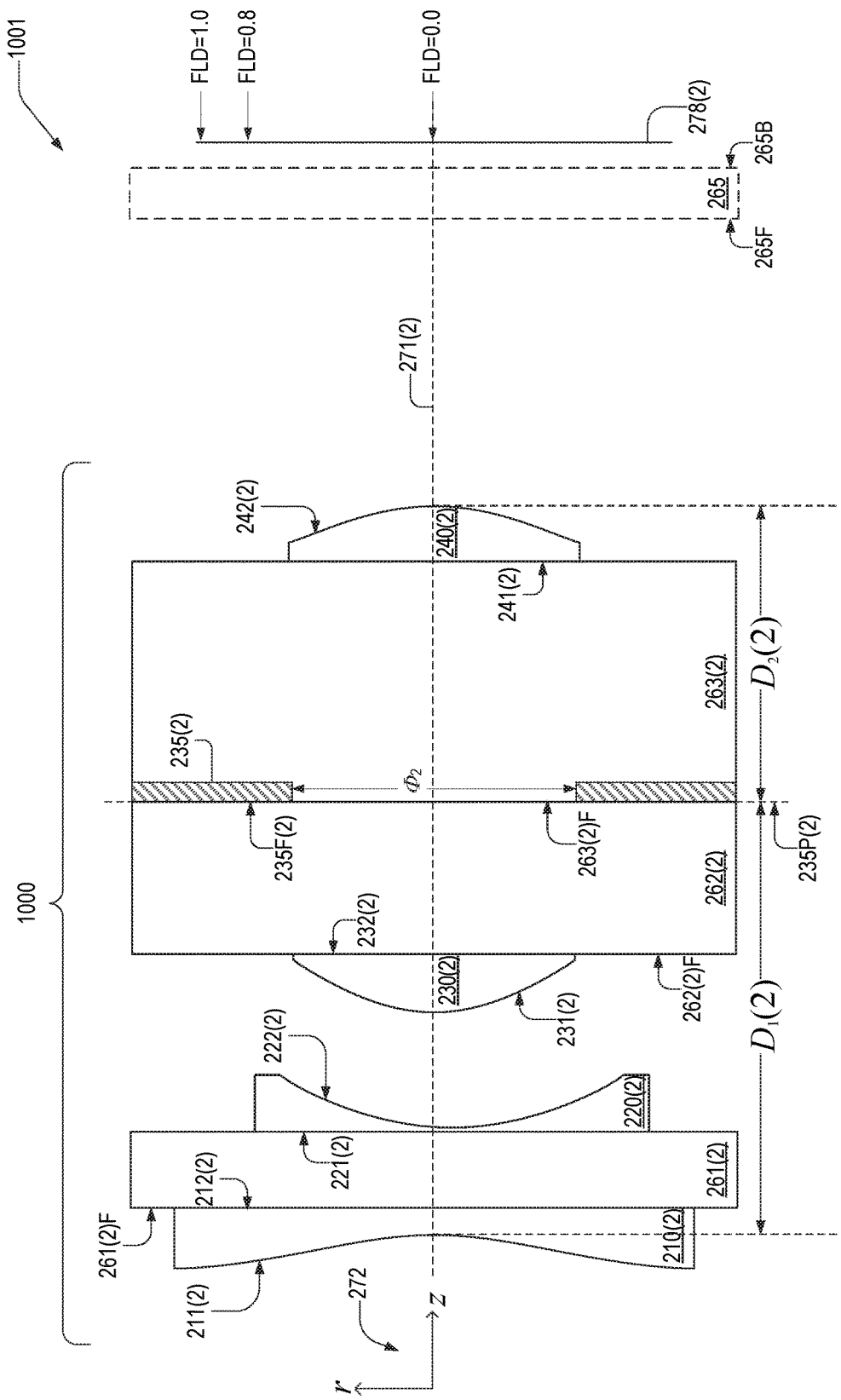
FIG. 10 is a cross-sectional view of an imaging system that includes a second embodiment of the four-element athermal lens of FIG. 2.

FIG. 10 is a cross-sectional view of a four-element athermal lens 1000 in an imaging system 1001. Imaging system 1001 also includes cover glass 265 between athermal lens 1000 and an image plane 278(2). Athermal lens 1000 has a full-angle field of view of $2\phi_2$=58.1° and a working f-number equal to 2.81.

Four-element athermal lens 1000 in is an embodiment of four-element athermal lens 200. Athermal lens 1000 includes substrates 261(2)-263(2), aperture stop 235(2) a first lens 210(2), a second lens 220(2), a third lens 230(2), and a fourth lens 240(2). Lenses 210(2), 220(2), 230(2), and 240(2) have respective planar surfaces 212(2), 221(2), 232(2), 241(2) and respective non-planar surfaces 211(2), 222(2), 231(2), and 242(2). Lenses 210(2), 220(2), 230(2), and 240(2) are coaxial with a common optical axis 271(2). Substrates 261(2)-263(2) have respective front surfaces 261(2)F-263(2)F.

Figure 11:
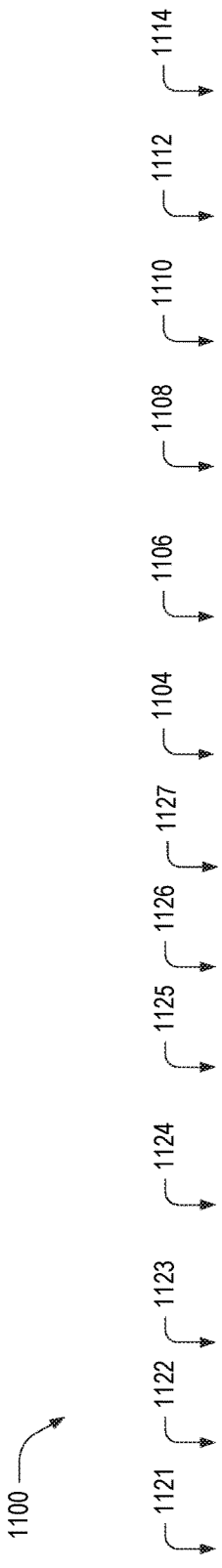
FIG. 11 shows a table of exemplary parameters of the four-element athermal lens of FIG. 10.

FIG. 11 shows a table 1100 of exemplary parameters of each surface of four-element athermal lens 1000. Table 1100 includes columns 1104, 1106, 1108, 1110, 1112, and 1121-1127. Surface column 1121 denotes surfaces of substrates 261(2)-263(2), cover glass 265, lenses 210(2), 220(2), 230(2), and 240(2), and an image plane 278(2) of FIG. 5. Column 1123 includes thickness values, in millimeters, between adjacent surfaces of four-element athermal lens 1000 on optical axis 271(2). Column 1123 includes center thicknesses of substrates 261(2)-263(2), cover glass 265, and lenses 210(2), 220(2), 230(2), and 240(2).

Column 1126 indicates the minimum diameter of each surface sufficient for a ray incident on surface 211(2) that passes through aperture stop 235(2) to pass through that surface. Aperture stop 235(2) has a diameter $ø_2$=0.78 mm.

It should be appreciated that imaging system 1001 need not include cover glass 265, in which image plane 278(2) shifts toward four-element athermal lens 1000.

Surfaces 211(2), 222(2), 231(2), and 242(2) are defined by surface sag $z_{sag}$, shown in Eqn. 1. Column 1122 of table 1100 lists $r_c$ values for surfaces 212(2), 222(2), 232(2), 241(2), and 252(2). Parameter k denotes the conic constant, shown in column 1127. Columns 1104, 1106, 1108, 1110, 1112, and 1114 contain values of aspheric coefficients $\alpha_4$, $\alpha_6$, $\alpha_8$, $\alpha_{10}$, $\alpha_{12}$, and $\alpha_{14}$ respectively. The units of quantities in table 1100 are consistent with $z_{sag}$ in Eqn. 1 being expressed in millimeters.

Column 1124 lists values of material refractive index $n_d$ at free-space wavelength $\lambda$=850 nm, and column 1125 lists the corresponding Abbe numbers $V_d$. Specifically, lenses 210(2), 220(2), 230(2), and 240(2) each have refractive index n=1.52 and Abbe number V=49.8.

Curved surfaces 211(2), 222(2), 231(2), and 242(2) have respective radii of curvature $R_1(2)$, $R_2(2)$, $R_3(2)$, and $R_4(2)$ shown in FIG. 11. Ratio $R_1(2)/R_4(2)$=2.02. Ratio $R_2(2)/R_3(2)$=1.50. Distance $D_1(2)$=2.20 and distance $D_2(2)$=1.56 such that $D_1(2)/D_2(2)$=1.41.

Figure 12A:
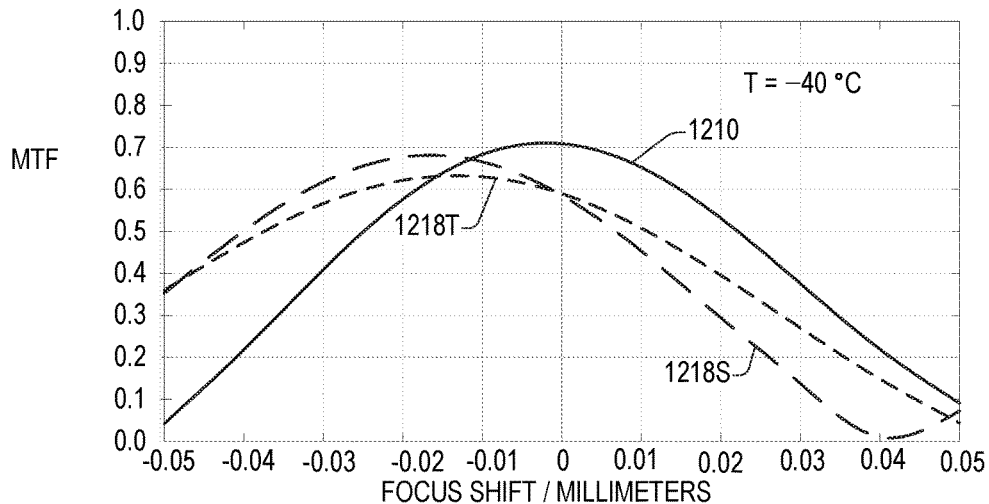
FIGS. 12A, 12B, and 12C are plots of the through-focus MTF of the four-element athermal lens of FIG. 10 at different respective temperatures.
Figure 12B:
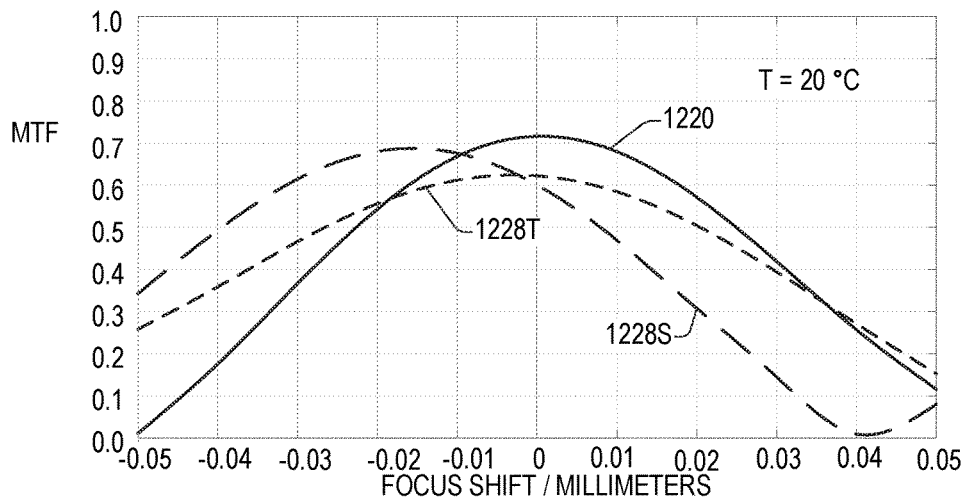
Figure 12C:
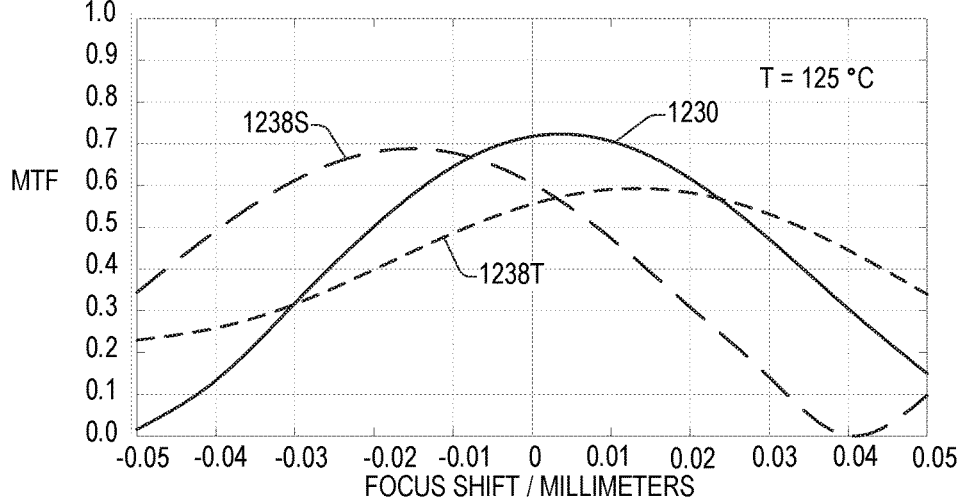

FIGS. 12A, 12B, and 12C are plots of the through-focus modulation transfer function (MTF), at 84 cycles/mm, of four-element athermal lens 1000 at temperatures $T_1$, $T_2$, and $T_3$, respectively. Each through-focus MTF data point is the average MTF value a wavelength range of 830 nm to 870 nm. Four-element athermal lens 1000 forms an image at normalized field positions FLD on image plane 278(1), where FLD is between zero and one and is normalized by half the diameter of image plane 278(1), shown in FIG. 4.

FIGS. 12A, 12B, and 12C include through-focus MTF curves 1210, 1220, and 1230, which correspond to FLD=0. A comparison of the peaks of MTF curves 1210, 1220, and 1230 shows that, between temperatures $T_1$ and $T_3$, the on-axis focal length shifts by $\Delta z_1 < 10$ μm or $$\frac{\Delta z_1}{\Delta T} < 0.10 \text{ μm/° C.}$$

FIGS. 12A, 12B, and 12C also include through-focus MTF curves 1218S, 1228S, and 1238S, which correspond to sagittal-plane MTF values at FLD=0.8, and through-focus MTF curves 1218T, 1228T, and 1238T, which correspond to tangential-plane MTF values at FLD=0.8. A comparison of the peaks of MTF curves 1218S, 1228S, and 1238S shows that, between temperatures $T_1$ and $T_3$, the sagittal-plane focal length at FLD=0.8 shifts by $\Delta z_1 < 5$ μm, or $$\frac{\Delta z_1}{\Delta T} < 0.05 \text{ μm/° C.}$$

A comparison of the peaks of MTF curves 1218T, 1228T, and 1238T shows that, between temperatures $T_1$ and $T_3$, the tangential-plane focal length at FLD=0.8 shifts by $\Delta z_1 < 30$ μm, or $$\frac{\Delta z_1}{\Delta T} < 0.18 \text{ μm/° C.}$$

FIGS. 13-16 are plots of longitudinal aberration, f-theta distortion, field curvature, and lateral color, respectively, of four-element athermal lens 1000 within imaging system 1001, as computed by Zemax®.

Figure 13A:
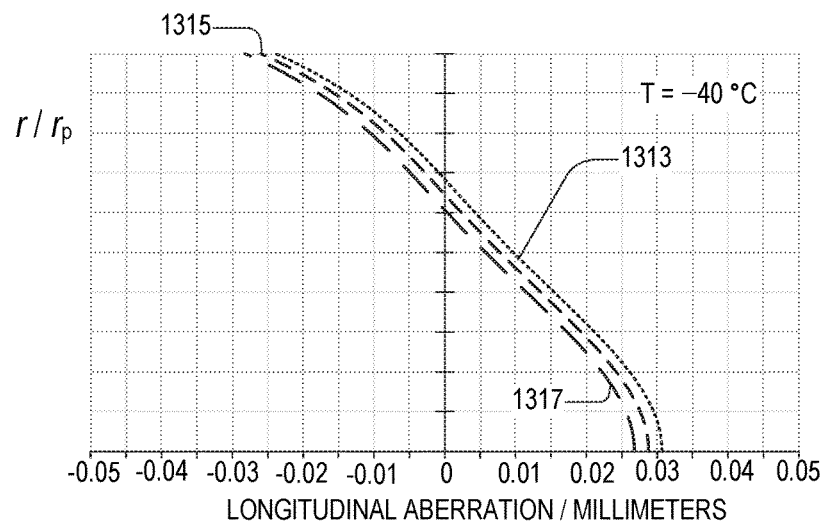
FIGS. 13A, 13B, and 13C are plots of the longitudinal aberration of the four-element athermal lens within the imaging system of FIG. 10.
Figure 13B:
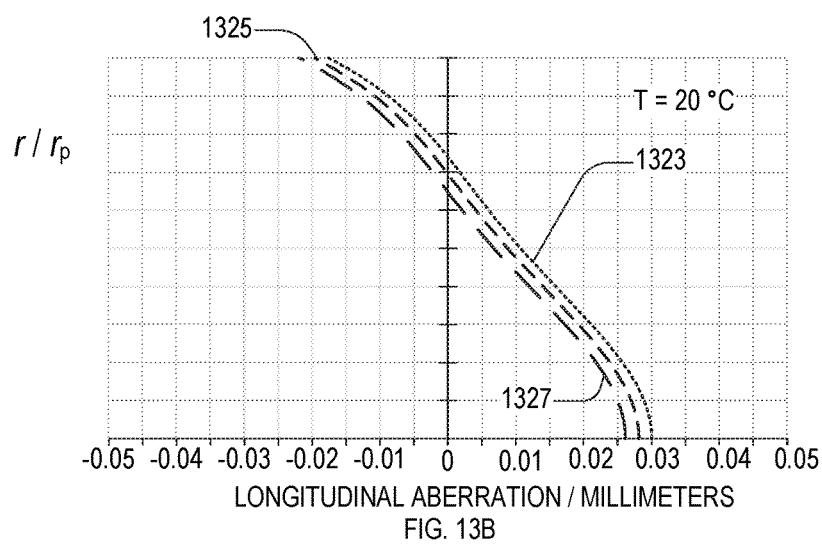
Figure 13C:
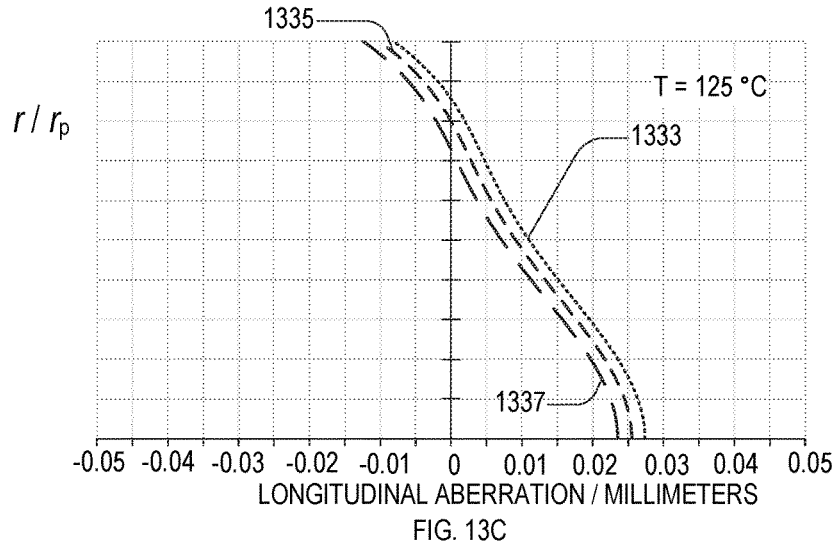

FIGS. 13A, 13B, and 13C are plots of the longitudinal aberration of four-element athermal lens 1000 at temperatures $T_1$, $T_2$, and $T_3$, respectively. Longitudinal aberration is plotted in units of millimeters as a function of normalized radial coordinate $r/r_p$, where $r_p=0.3307$ mm is the maximum entrance pupil radius. Longitudinal aberration curves 1313, 1323, and 1333 are computed at wavelength $\lambda_1$. Longitudinal aberration curves 1315, 1325, and 1335 are computed at wavelength $\lambda_2$. Longitudinal aberration curves 1317, 1327, and 1337 are computed at wavelength $\lambda_3$.

Figure 14A:
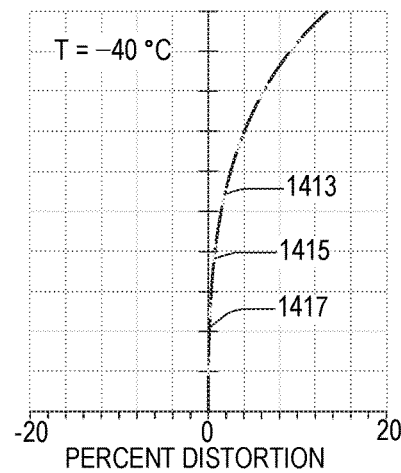
FIGS. 14A, 14B, and 14C are plots of the f-theta distortion of the four-element athermal lens within the imaging system of FIG. 10.
Figure 14B:
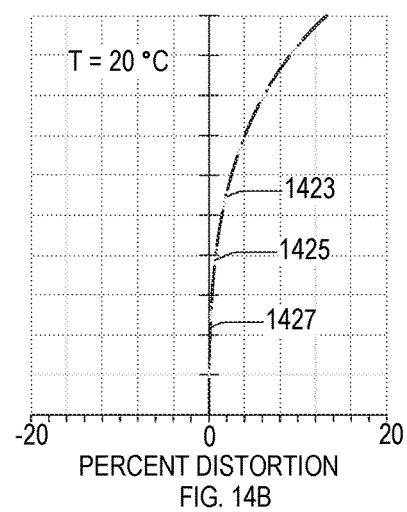
Figure 14C:
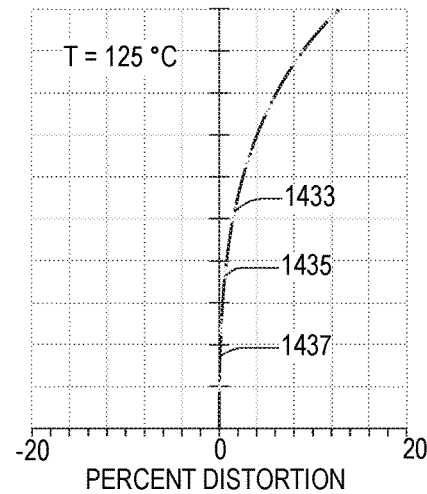

FIGS. 14A, 14B, and 14C are plots of f-theta distortion, versus field angle of four-element athermal lens 1000 at temperatures $T_1$, $T_2$, and $T_3$, respectively. The maximum field angle plotted in FIG. 14 is $\phi_2=29.3°$, which is half of lens 1000's field of view. Distortion curves 1413, 1423, and 1433 are computed at wavelength $\lambda_1$; distortion curves 1415, 1425, and 1435 are computed at wavelength $\lambda_2$; and distortion curves 1417, 1427, and 1437 are computed at wavelength $\lambda_3$.

Figure 15A:
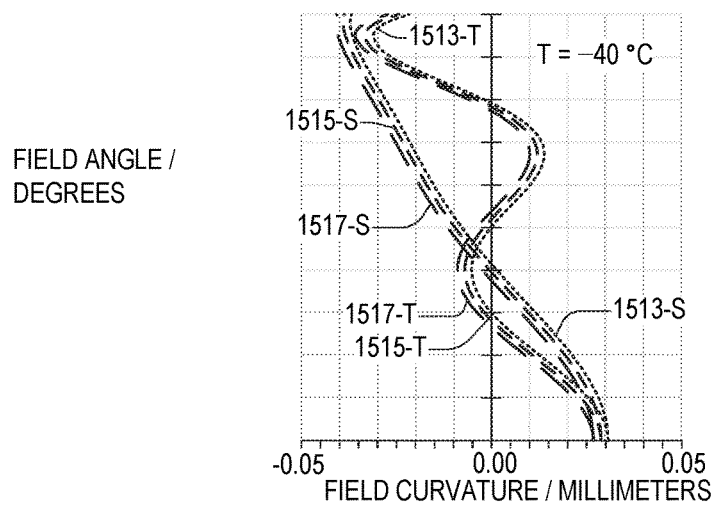
FIGS. 15A, 15B, and 15C are plots of the Petzval field curvature of the four-element athermal lens within the imaging system of FIG. 10.
Figure 15B:
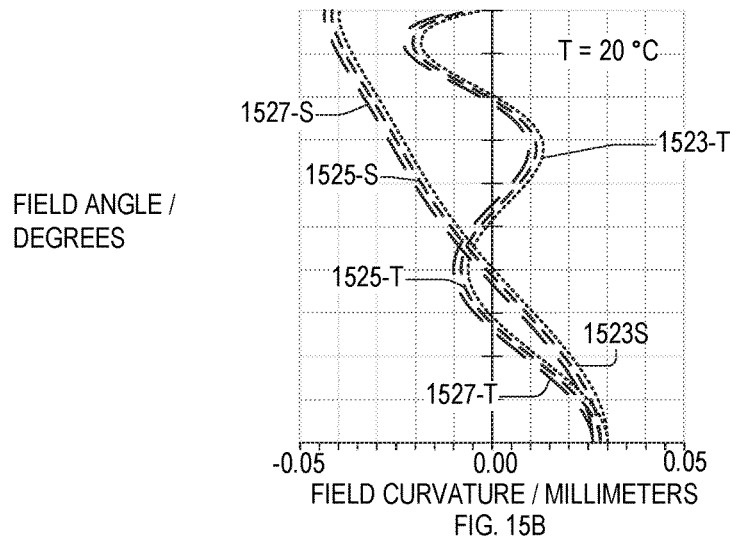
Figure 15C:
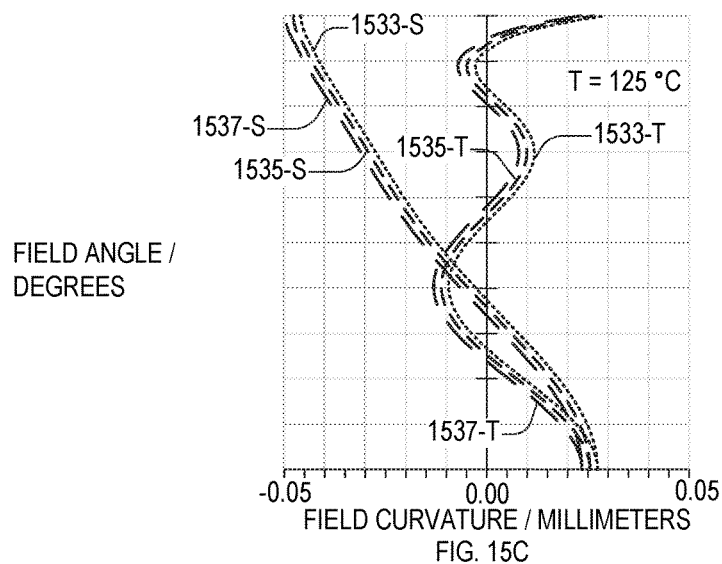

FIGS. 15A, 15B, and 15C are plots of Petzval field curvature, versus field angle of four-element athermal lens 1000 at temperatures $T_1$, $T_2$, and $T_3$, respectively. The field curvature is plotted for field angles between zero and C. Field curvature curves 1513-S/1523-S/1533-S and field curvature curves 1513-T/1523-T/1533-T (short dashes) are computed at wavelength $\Delta_1$ in the sagittal and tangential planes, respectively. Field curvature curves 1515-S/1525-S/1535-S and field curvature curves 1515-T/1525-T/1535-T (medium dashes) are computed at wavelength $\lambda_2$ in the sagittal and tangential planes, respectively. Field curvature curves 1517-S/1527-S/1537-S and field curvature curves 1517-T/1527-T/1537-T (long dashes) correspond to field curvature at wavelength $\lambda_3$ in the sagittal and tangential planes, respectively.

Figure 16A:
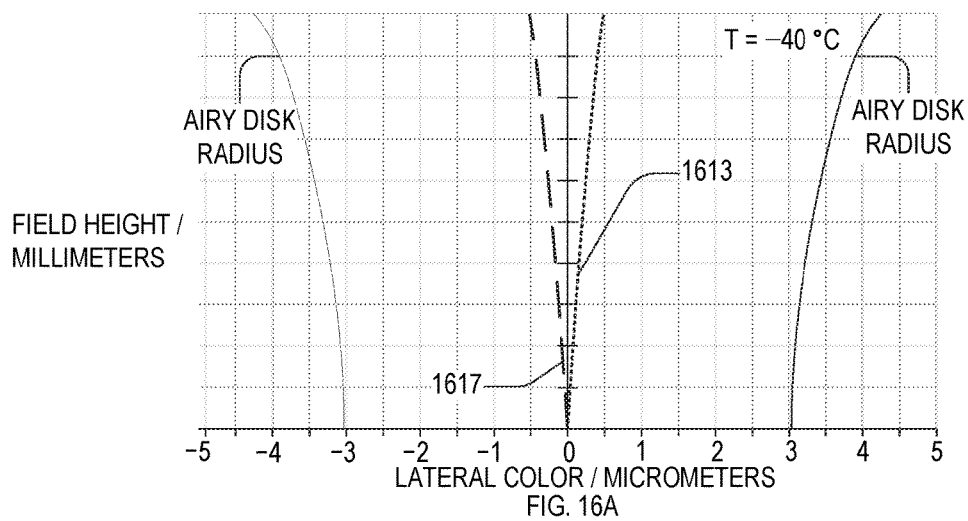
FIGS. 16A, 16B, and 16C are plots of the lateral color error of the four-element athermal lens within the imaging system of FIG. 10.
Figure 16B:
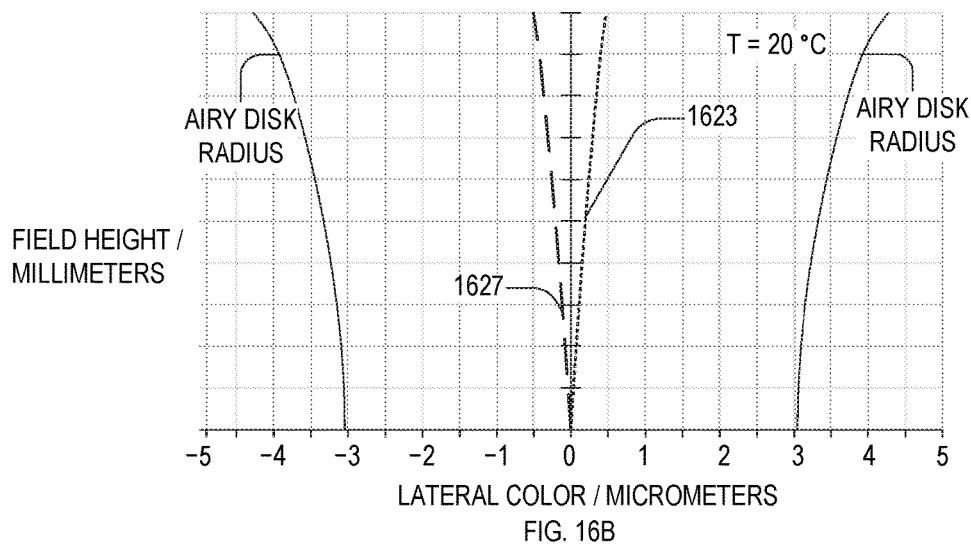
Figure 16C:
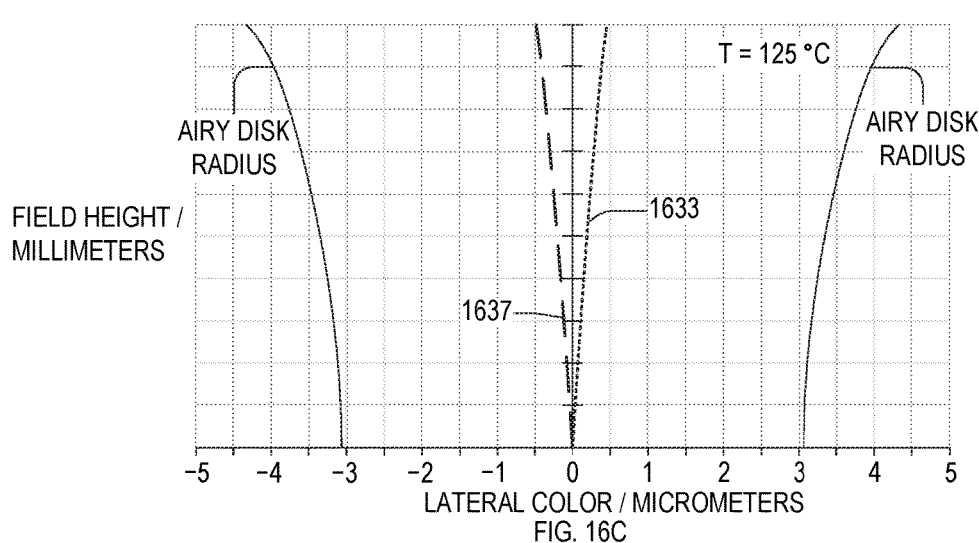

FIGS. 16A, 16B, and 16C are plots of lateral color error, also known as transverse chromatic aberration, versus field height of four-element athermal lens 1000 at temperatures $T_1$, $T_2$, and $T_3$, respectively. Field height ranges from $h_{min}=0$ (on-axis) to $h_{max}=1.20$ mm in image plane 278(1). Lateral color is referenced to $\lambda_2$, and hence the lateral color for $\lambda_2$ is zero for all field heights. Lateral color curves 1613, 1623, and 1633 are computed at wavelength $\lambda_1$. Lateral color curves 1617, 1627, and 1637 are computed at wavelength $\lambda_3$.

Figure 18:
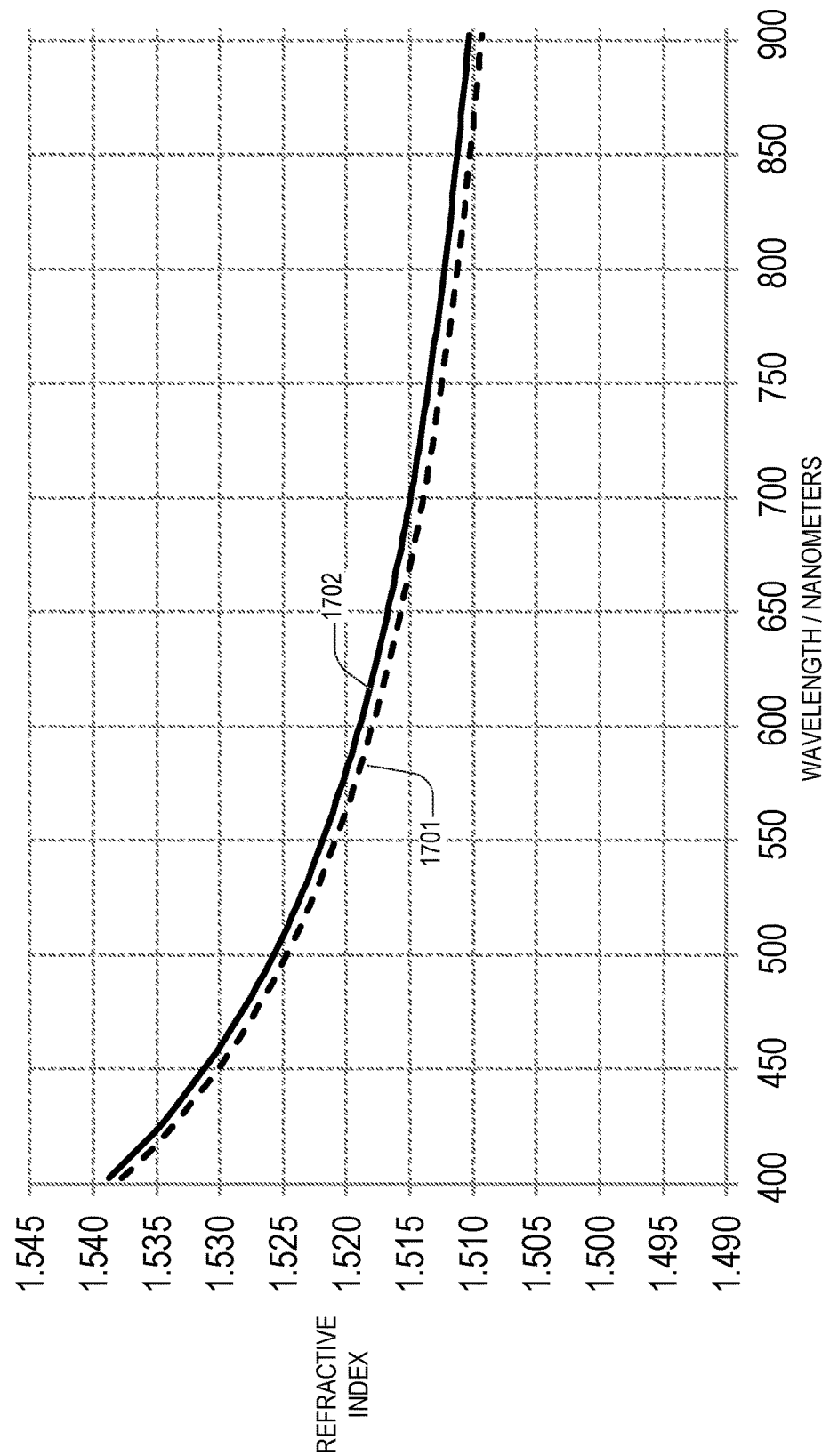
FIG. 18 is a graph of refractive index values shown in the table of FIG. 17.

FIG. 17 is of a table and FIG. 18 is a graph of exemplary wavelength-dependent refractive indices 1701 and 1702 at free-space wavelengths between four-hundred nanometers and nine-hundred nanometers and temperature T=28° C. In four-element athermal lens 300, lenses 210(1) and 220(1) each have refractive index 1701, and lenses 230(1) and 240(1) each have refractive index 1702. In four-element athermal lens 1000, lenses 210(2) and 220(2) each have refractive index 1701, and lenses 230(2) and 240(2) each have refractive index 1702.

FIG. 19 is a table of refractive indices 1901 and 1902 at free-space wavelengths 830 nm, 850 nm, and 870 nm at temperatures $T_1$, $T_2$, and $T_3$. In four-element athermal lens 300, lenses 210(1) and 220(1) each have refractive index 1901, and lenses 230(1) and 240(1) each have refractive index 1902. In four-element athermal lens 1000, lenses 210(2) and 220(2) each have refractive index 1901, and lenses 230(2) and 240(2) each have refractive index 1902. At any of the wavelengths 830 nm, 850 nm, and 870 nm, a temperature dependence $$\frac{\Delta n}{\Delta T}$$

of refractive index 1901 is 2.3 times that of refractive index 1902. For example, at $\lambda_0=850$ nm and between $-40°$ C. and $125°$ C. ($\Delta T=165°$ C.), refractive index 1901 increases by $\Delta n_1=0.037$ and refractive index 1901 increases by $\Delta n_2=0.016$, such that $$\frac{\Delta n_1}{\Delta n_2} = 2.3.$$

The value of $$\frac{\Delta n_1}{\Delta n_2}$$

is the same $$\left(\text{i.e., } \frac{\Delta n_1}{\Delta n_2} = 2.3\right)$$

for different temperature changes, e.g., $\Delta T=60°$ C. between $-40°$ C. and $20°$ C. and $\Delta T=65°$ C. between $20°$ C. and $125°$ C.

Features described above as well as those claimed below may be combined in various ways without departing from the scope hereof. The following examples illustrate some possible, non-limiting combinations:

(A1) A four-element athermal lens includes four coaxially aligned lenses including a (i) first lens and, in order of increasing distance therefrom and on a same side thereof, (ii) a second lens, a third lens, and a fourth lens. The first lens and the second lens are positive lenses. The third and fourth lenses are negative lenses. The first lens, second lens, third lens, and fourth lens having respective refractive indices $n_1$, $n_2$, $n_3$, and $n_4$, a difference between (i) the maximum of $n_1$, $n_2$, $n_3$, and $n_4$ and (ii) the minimum of $n_1$, $n_2$, $n_3$, and $n_4$ being less than 0.05 in a free-space wavelength range.

(A2) In the four-element athermal lens denoted by (A1), refractive indices $n_1$, $n_2$, $n_3$, and $n_4$ may have respective temperature dependences $$\frac{\Delta n_1}{\Delta T}, \frac{\Delta n_2}{\Delta T}, \frac{\Delta n_3}{\Delta T}, \frac{\Delta n_4}{\Delta T},$$

each of $$\frac{\Delta n_1}{\Delta T} \text{ and } \frac{\Delta n_2}{\Delta T}$$

exceeding, in the free-space wavelength range, each of $$\frac{\Delta n_3}{\Delta T} \text{ and } \frac{\Delta n_4}{\Delta T}$$

by a factor between 2.05 and 2.85, inclusive.

(A3) In any four-element athermal lens denoted by one of (A1) and (A2), the free-space wavelength range may be from 830 nm to 870 nm.

(A4) In any four-element athermal lens denoted by one of (A1) through (A3), each refractive index $n_1$, $n_2$, $n_3$, and $n_4$ may satisfy n=1.51±0.05 at free-space wavelengths between 830 nm and 870 nm.

(A5) In any four-element athermal lens denoted by one of (A1) through (A4), in which the first lens, second lens, third lens, and fourth lens have respective Abbe numbers $V_1$, $V_2$, $V_3$, and $V_4$, a relative difference between (i) the maximum of $V_1$, $V_2$, $V_3$, and $V_4$ and (ii) the minimum of $V_1$, $V_2$, $V_3$, and $V_4$ may be less than five percent.

(A6) Any four-element athermal lens denoted by one of (A1) through (A5) may have at, at temperatures T between −40° C. and 125° C., a temperature-dependent focal length shift $$\frac{\Delta f}{\Delta T} < 0.20 \text{ µm/°C}.$$

within the free-space wavelength range.

(A7) Any four-element athermal lens denoted by one of (A1) through (A6) may further an optical axis and an aperture stop. The aperture stop is located (i) between the third lens and the fourth lens, (ii) in a plane intersecting the optical axis at a distance $D_1$ from a concave surface of the first lens, and (iii) a distance $D_2$ from a convex surface of the fourth lens. Distances $D_1$ and $D_2$ may satisfy $$\frac{D_1}{D_2} < 1.58$$

and the total axial length of the four-element athermal lens may be $D_1+D_2$.

(A8) In any four-element athermal lens denoted by one of (A1) through (A7), the first lens and the fourth lens may have respective radii of curvature $R_1$ and $R_4$ that satisfy $R_1/R_4 > 1.444$.

(A9) In any four-element athermal lens denoted by one of (A1) through (A8), the second lens and the third lens may have respective radii of curvature $R_2$ and $R_3$ that satisfy $R_2/R_3 < 1.654$.

(A10) Any four-element athermal lens denoted by one of (A1) through (A9) may further include a first biplanar substrate and a second biplanar substrate. The first biplanar substrate has a first side opposite a second side, a planar surface of the first lens being disposed on a first side, a planar surface of the second lens being disposed on a second side. The second biplanar substrate has a first side opposite a second side, a planar surface of the third lens being disposed on a first side, a planar surface of the fourth lens being disposed on a second side.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A four-element athermal lens comprising: four coaxially aligned lenses including a (i) first lens and, in order of increasing distance therefrom and on a same side thereof, (ii) a second lens, a third lens, and a fourth lens;
   the first lens and the second lens being negative lenses,
   the third lens and the fourth lens being positive lenses,
   the first lens, second lens, third lens, and fourth lens having respective refractive indices $n_1$, $n_2$, $n_3$, and $n_4$, each satisfying n=1.51±0.05 in a free-space wavelength range between 830 nm and 870 nm,
   refractive indices $n_1$, $n_2$, $n_3$, and $n_4$ having respective temperature dependences $$\frac{\Delta n_1}{\Delta T}, \frac{\Delta n_2}{\Delta T}, \frac{\Delta n_3}{\Delta T}, \frac{\Delta n_4}{\Delta T},$$

each of $$\frac{\Delta n_1}{\Delta T} \text{ and } \frac{\Delta n_2}{\Delta T}$$

exciding, in the free-space wavelength range, each of $$\frac{\Delta n_3}{\Delta T} \text{ and } \frac{\Delta n_4}{\Delta T}$$

by a factor between 2.05 and 2.85, inclusive.

2. The four-element athermal lens of claim 1, the first lens, second lens, third lens, and fourth lens having respective Abbe numbers $V_1$, $V_2$, $V_3$, and $V_4$; a relative difference between (i) the maximum of $V_1$, $V_2$, $V_3$, and $V_4$ and (ii) the minimum of $V_1$, $V_2$, $V_3$, and $V_4$ being less than five percent.

3. The four-element athermal lens of claim 1, further comprising:
    an optical axis; and
    an aperture stop located (i) between the third lens and the fourth lens, (ii) in a plane intersecting the optical axis at a distance $D_1$ from a concave surface of the first lens, and (iii) a distance $D_2$ from a convex surface of the fourth lens;
    $D_1$ and $D_2$ satisfying $$\frac{D_1}{D_2} < 1.58;$$

the total axial length of the four-element athermal lens being $D_1 + D_2$.

4. The four-element athermal lens of claim 1, the first lens and the fourth lens having respective radii of curvature $R_1$ and $R_4$ that satisfy $R_1/R_4 > 1.444$.

5. The four-element athermal lens of claim 1, the second lens and the third lens having respective radii of curvature $R_2$ and $R_3$ that satisfy $R_2/R_3 < 1.654$.

6. The four-element athermal lens of claim 1, the first and second lens each being plano-concave, the four-element athermal lens further comprising:
    a first biplanar substrate having a first side opposite a second side, a planar surface of the first lens being disposed on a first side, a planar surface of the second lens being disposed on a second side; and
    a second biplanar substrate having a first side opposite a second side, a planar surface of the third lens being disposed on a first side, a planar surface of the fourth lens being disposed on a second side.

7. The four-element athermal lens of claim 6, the four-element athermal lens having at, at temperatures T between −40° C. and 125° C., a temperature-dependent focal length shift $$\frac{\Delta f}{\Delta T} < 0.20 \ \mu m/° C.$$

within the free-space wavelength range.

8. A four-element athermal lens comprising:
    four coaxially aligned lenses including a first lens and, in order of increasing distance therefrom and on a same side thereof, a second lens, a third lens, and a fourth lens;
    the first lens and the second lens being negative lenses,
    the third lens and the fourth lens being positive lenses,
    the first lens, second lens, third lens, and fourth lens having respective refractive indices $n_1$, $n_2$, $n_3$, and $n_4$, each satisfying $n = 1.51 \pm 0.05$ in a free-space wavelength range between 830 nm and 870 nm,
    the first lens and the fourth lens having respective radii of curvature $R_1$ and $R_4$ that satisfy $R_1/R_4 > 1.444$,
    the second lens and the third lens having respective radii of curvature $R_2$ and $R_3$ that satisfy $R_2/R_3 < 1.654$.

9. The four-element athermal lens of claim 8, the first lens, second lens, third lens, and fourth lens having respective Abbe numbers $V_1$, $V_2$, $V_3$, and $V_4$, a relative difference between (i) the maximum of $V_1$, $V_2$, $V_3$, and $V_4$ and (ii) the minimum of $V_1$, $V_2$, $V_3$, and $V_4$ being less than five percent.

10. The four-element athermal lens of claim 8, further comprising:
    an optical axis; and
    an aperture stop located (i) between the third lens and the fourth lens, (ii) in a plane intersecting the optical axis at a distance $D_1$ from a concave surface of the first lens, and (iii) a distance $D_2$ from a convex surface of the fourth lens;
    $D_1$ and $D_2$ satisfying $$\frac{D_1}{D_2} < 1.58;$$

the total axial length of the four-element athermal lens being $D_1 + D_2$.

11. The four-element athermal lens of claim 8, refractive indices $n_1$, $n_2$, $n_3$, and $n_4$ having respective temperature dependences $$\frac{\Delta n_1}{\Delta T}, \frac{\Delta n_2}{\Delta T}, \frac{\Delta n_3}{\Delta T}, \frac{\Delta n_4}{\Delta T},$$

each of $$\frac{\Delta n_1}{\Delta T} \text{ and } \frac{\Delta n_2}{\Delta T}$$

exceeding, in the free-space wavelength range, each of $$\frac{\Delta n_3}{\Delta T} \text{ and } \frac{\Delta n_4}{\Delta T}$$

by a factor between 2.05 and 2.85, inclusive.

12. The four-element athermal lens of claim 8, the first and second lens each being plano-concave, the four-element athermal lens further comprising:
    a first biplanar substrate having a first side opposite a second side, a planar surface of the first lens being disposed on a first side, a planar surface of the second lens being disposed on a second side; and
    a second biplanar substrate having a first side opposite a second side, a planar surface of the third lens being disposed on a first side, a planar surface of the fourth lens being disposed on a second side.

13. The four-element athermal lens of claim 12, having, at temperatures T between −40° C. and 125° C., a temperature-dependent focal length shift $$\frac{\Delta f}{\Delta T} < 0.20 \ \mu m/° C.$$

within the free-space wavelength range.

* * * * *